US005571982A

United States Patent [19]
Masubuchi

[11] Patent Number: 5,571,982
[45] Date of Patent: Nov. 5, 1996

[54] KEYBOARD FOR ELECTRONIC MUSICAL INSTRUMENT

[75] Inventor: Takamichi Masubuchi, Hamamatsu, Japan

[73] Assignee: Yamaha Corporation, Japan

[21] Appl. No.: 113,720

[22] Filed: Aug. 27, 1993

[30] Foreign Application Priority Data

| | | | |
|---|---|---|---|
| Aug. 31, 1992 | [JP] | Japan | 4-255620 |
| Aug. 31, 1992 | [JP] | Japan | 4-255621 |
| Aug. 31, 1992 | [JP] | Japan | 4-255623 |

[51] Int. Cl.[6] .................. G01P 3/00; G10H 1/32

[52] U.S. Cl. .................. 84/658; 84/687; 84/743; 84/DIG. 7

[58] Field of Search .................. 84/626, 627, 639–641, 84/644, 662, 670, 687–690, 701, 702, 718, 720, 730, 734, 737, 738, 743, 745

[56] References Cited

U.S. PATENT DOCUMENTS

| | | | |
|---|---|---|---|
| 3,965,789 | 6/1976 | Pearlman . | |
| 3,979,990 | 9/1976 | Hinago . | |
| 4,052,923 | 10/1977 | Cohn | 84/DIG. 7 |
| 4,111,091 | 9/1978 | Hinago | 84/DIG. 7 |
| 4,362,934 | 12/1982 | McLey | 84/DIG. 7 |
| 4,468,999 | 9/1984 | Bonanno | 84/687 |
| 4,615,252 | 10/1986 | Yamauchi et al. . | |
| 4,665,788 | 5/1987 | Tripp et al. | 84/658 |
| 5,025,705 | 6/1991 | Raskin | 84/743 |
| 5,107,748 | 4/1992 | Muramatsu et al. . | |

FOREIGN PATENT DOCUMENTS

| | | |
|---|---|---|
| 61-30186 | 9/1986 | Japan . |
| 2-131793 | 11/1990 | Japan . |
| 3-6699 | 1/1991 | Japan . |
| 3-35596 | 4/1991 | Japan . |

*Primary Examiner*—Vit W. Miska
*Attorney, Agent, or Firm*—Graham & James LLP

[57] ABSTRACT

An electronic musical tone signal controller has a resilient operating member, at least two sensors mounted on the operating member at at least two different positions in the longitudinal direction so as to detect the distortion amount of the operating member, a musical tone control signal generating unit for obtaining a force applied to the operating member and a force-applied position of the operating member in accordance with a signal outputted from each sensor, and generating a control signal corresponding to the obtained force and position, and a musical tone signal generating unit for generating a musical tone signal in accordance with the control signal supplied from the musical tone control signal generating unit. The direction of a force applied to the operating member may be obtained by using signals from the sensors to generate a control signal corresponding to the force direction. The tone signal controller is suitable for an electronic musical instrument which generates a continuous tone from a key depression force.

36 Claims, 21 Drawing Sheets

KEYBOARD FOR ELECTRONIC MUSICAL INSTRUMENT

BACKGROUND OF THE INVENTION a) Field of the Invention

The present invention relates to an actuator or operating member for electronic musical instruments.

b) Description of the Related Art

Strings of a natural musical instrument, piano, are struck by hammers operated from a keyboard. The keyboard of an electronic musical instrument has a number of keys for playing the instrument. Musical tones to be produced by the instrument are controlled, for example, by detecting an initial touch of depressing a key (hereinafter called an operating member) and arm after-touch of strongly or deeply pushing the operating member while depressing it.

The initial touch of each operating member is detected as the depression velocity of the member by a two-make switch mounted under the member. The after-touch is detected by a pressure sensor mounted on a stopper which prevents each operating member from being depressed lower than predetermined position.

Examples of a conventional operating device for an electronic musical instrument are shown in FIGS. 5A and 5B.

An operating device shown in FIG. 5A has an operating member 6 which is rotatable about a fulcrum K formed on a support frame 2.

The operating member 6 is always forced to rotate in the counter clockwise direction as viewed in FIG. 5A by a spring 7. The upward and downward rotations of the operating member 6 are restricted by upper and lower stoppers 9A and 9B. Under the operating member 6, two switches 11A and 11B are mounted having different on-strokes.

An operating device shown in FIG. 5B has an operating member 6 with a thin neck portion K via which the member 6 is mounted on a support frame 2. When a force is applied to the operating member 6, it rotates in the clockwise direction about the neck portion K. Similar to the device shown in FIG. 5A, the upward and downward rotations of the operating member 6 are restricted by upper and tower stoppers 9A and 9B.

The initial touch of the operating member 6 shown in FIG. 5B is detected as the depression velocity by a two-make switch 11. The after-touch is detected by a pressure sensor mounted on the stopper 9B.

The performance of a player, expressed for example by a force applied to the operating member shown in FIG. 5A or 5B during the period from the detection of the initial touch to the detection of the after-touch, generates musical tones.

An electronic musical instrument can generate various kinds of musical tones. It is desirable that the operating member of the instrument can generate parameters suitable for controlling such various kinds of musical tones.

It is desirable, particularly for a continuous tone to be produced by a bow of a stringed instrument, to detect the details of a whole stroke of each operating member in order to reproduce the fidelity of the performance of a player, for example, by using the method of detecting a large amount of data during a whole stroke of each member.

FIG. 5C shows the relationship between the displacement amount of the operating member 6 shown in FIG. 5A or 5B and the depression force of a player. At the initial stage, for example, up to the displacement of 0.5 mm, the displacement of the operating member 6 is proportional to the depression force applied to it.

During the main depression stroke, after the initial stage up to the displacement of 10 mm, the depression force changes little.

After the displacement of 10 mm, the force increases greatly with a small displacement because of the abutment of the operating member with the stopper.

In the experiment result shown in FIG. 5C, the force applied to the operating member 6 was about 50 gram-weight at the displacement of 0.5 mm, and was about 70 gram-weight at the displacement of 10 mm.

FIG. 5D shows the relationship between the force and displacement of the operating member 6 during one stroke. In FIG. 5D, the solid line indicates the force applied by a player, and the one-dot-chain line indicates the detected displacement. The abscissa represents time, and the ordinate represents the displacement and force.

As shown in FIG. 5D, the displacement is proportional to the force applied by the player during the initial and final stages (up to 50 gram-weight).

However, during the range from 50 gram-weight to 70 gram weight, the displacement changes greatly, and thereafter during the range over 70 gram-weight, it changes little, although the force actually applied by the player changes as shown in FIG. 5D.

Therefore, if the musical tone is controlled in accordance with an output from a sensor, a change of the force applied to the operating member by a player is exaggerated during one range, and is almost neglected during the other range. Therefore, the intention of a player giving a performance including a continuous tone cannot be fully reflected upon the output of a sensor.

During the range from 0.5 mm to 10 mm, the displacement changes greatly with a change in the force applied to the operating member. Therefore, it is difficult to finely control the performance by changing the force.

In the above description, the depression force is applied to the same position of the operating member during one stroke. If the force applying position is changed during one stroke, a detected force changes even if the same force is applied. Namely, as the operating member is depressed at the position more remote from the fulcrum, the force applied to a sensor becomes large. However, there is a performance style which requires to control musical tones only by the depression force independent from the force applying position.

As described above, conventional operating members for an electronic musical instrument have often many restrictions of the performance which uses various kinds of musical tones.

SUMMARY OF THE INVENTION

It is an object of the present invention to provide an operating device for an electronic musical instrument having a novel function suitable for giving a performance.

It is another object of the present invention to provide an operating device for an electronic musical instrument capable of controlling musical tones by the force itself applied during a performance.

It is a further object of the present invention to provide an operating device for an electronic musical instrument capable of giving a performance, in accordance with the force applied by a player to an operating member of the device during the period from immediately after the contact of a finger to the removal thereof.

It is a still further object of the present invention to provide an operating device for an electronic musical instrument capable of detecting the force applying position of an operating member and the actual force applied thereto.

It is another object of the present invention to provide an operating device for an electronic musical instrument capable of controlling a tone signal in accordance with the force applying position of an operating member and the intensity of the actual force.

It is a further object of the present invention to provide an operating device for an electronic musical instrument capable of controlling a tone signal by using as a control parameter the force applying angle relative to an operating member.

According to one aspect of the present invention, there is provided an operating device for an electronic musical instrument comprising an operating member of a predetermined length supported at end of said operating member; at least two sensors mounted on the operating member at two different positions in the longitudinal direction, each sensor generating a signal proportional to the distortion amount of the operating member; and musical tone controlling means for obtaining a difference between two signals outputted from the two sensors and generating a control signal so as to control a musical tone to be generated, in accordance with said difference.

As the operating member is depressed with a finger of a player, each sensor distorts. The moments M1 and M2 received by the sensors are known from outputs of the sensors.

From the balance conditions of the moments M1 and M2 and a force F applied to the operating member, the force F becomes proportional to (M2–M1) independently from the position of the operating member where the force is applied by the player.

By using two sensors, the depression force applied to the operating member can be known independently from the depression position.

Therefore, the musical tone controlling means can control a musical tone in accordance with a difference between two sensor signals corresponding to the depression force.

Musical tones well matching the performance given by a player can be produced by detecting the force applied to a keyboard type operating member and controlling the tones in accordance with the detected force.

According to another aspect of the present invention, there is provided an operating device for an electronic musical instrument comprising: an operating member supporting member; an operating member of a cantilever structure having a fixed end and a free end, the fixed end being fixed to the operating member supporting member; at least two sensors mounted at different position on the operating member for generating an electrical output corresponding to a depression force applied to the operating member, and musical tone signal generating means for generating a musical tone in accordance with an output of the sensors.

The operating member of a cantilever structure distorts in proportion to a force applied by a finger of a player. Each sensor generates an electrical output corresponding to the applied force.

Outputs of the sensors are applied to the musical tone signal generating means which generates musical tone signals in accordance with the outputs of the sensors.

Musical tones as intended by a player can be generated faithfully during the whole period from immediately after the depression of the operating member to the release of the depression.

According to a further aspect of the present invention, there is provided an operating device for an electronic musical instrument comprising: an operating member; two sensors mounted on the operating member at two different positions in the longitudinal direction for detecting the distortion amount of the operating member; and musical tone control signal generating means for obtaining a force-applied to the operating member and a force applied position of the operating member in accordance with a signal outputted from each sensor, and for generating a control signal corresponding to the obtained force and position.

According to another aspect of the present invention, there is provided an operating device for an electronic musical instrument comprising: an operating member; two sensors mounted on the operating member at two different positions for detecting the distortion amount of the operating member; and musical tone control signal generating means for obtaining a force applied to the operating member in accordance with a signal outputted from each sensor, and for generating a control signal corresponding to the obtained force.

As the operating member is depressed by a player, the distortion detecting sensors distort. The moment M received by the sensor can be known from an output of the sensor.

From the balance conditions of a force F applied to the operating member and the moments M, it is possible to know a relationship between the force F and moments M and a relationship between the position x where the force F is applied and the moments M. Because the moments M are known from outputs of the sensors, the force F and position x can be known.

Similarly, from the balance conditions of the force F and moments M and from the outputs of the sensors, the direction θ of the force F can be known.

The musical tone control signal generating means obtains the force F, position x, and direction h and generates a control signal in accordance with outputs of the sensors.

It is possible to provide an operating device for an electronic musical instrument capable of controlling a musical tone by a force applied during a performance.

It is also possible to provide an operating device for an electronic musical instrument capable of detecting a force applied to the operating member independently from the depression position.

It is possible to provide an operating device capable of giving a performance rich in expression in accordance with the force applied to the operating member during the period from immediately after the touch of a finger of a player to the removal of the finger.

It is also possible to provide an operating device for an electronic musical instrument capable of controlling musical tones well matching the performance given by a player by detecting the force applied position arid the force independently from the force applied position.

It is possible to provide an operating device for an electronic musical instrument capable of controlling a musical tone by using the force applied position and the force as control parameters.

It is possible to provide an operating device for an electronic musical instrument capable of controlling a musical tone by using the angle of a force as a control parameter.

BRIEF DESCRIPTION OF THE DRAWINGS

FIG. 5C shows the relationship between a displacement and a depression force applied by a player, and FIG. 5D shows the relationship between a force and displacement relative to time.

DETAILED DESCRIPTION OF THE PREFERRED EMBODIMENTS

A musical tone signal can be generated by processing signals from strain gauges attached to an operating member of an electronic musical instrument, and by inputting a processed signal to a tone signal generator. The operating member may be formed of a metal, such as aluminium, which deforms or strains upon application of a force. When the deformation is small, it exhibits elastic or resilient behavior. The processed signal is proportional to the force applied to the operating member.

Figure 4:
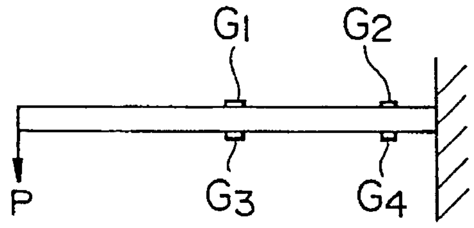
FIG. 4 is a diagram showing the operating device according to another embodiment of the present invention.
Figure 5A:
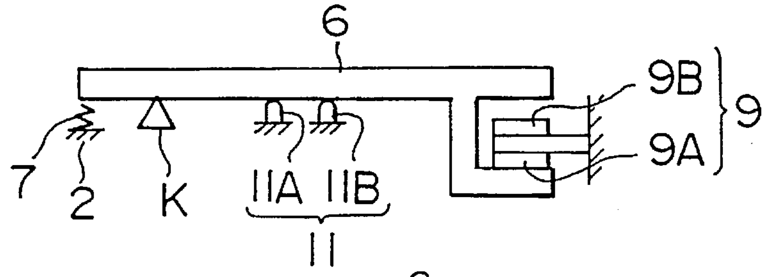
FIG. 5A PRIOR ART
FIGS. 5A to 5D are schematic diagrams illustrating a conventional operating device and how the displacement is made.
Figure 5B:
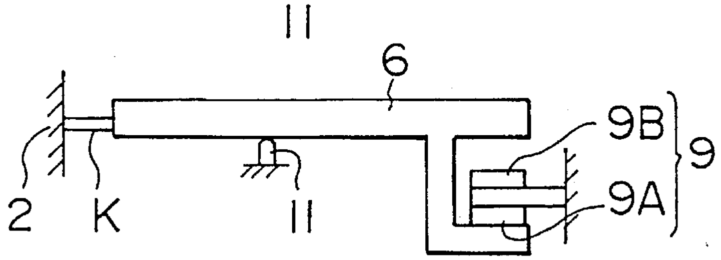
FIG. 5B PRIOR ART
Figure 5C:
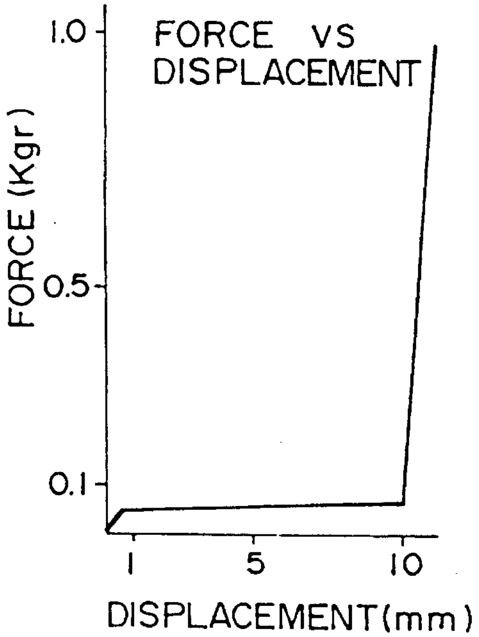
FIG. 5C PRIOR ART
Figure 5D:
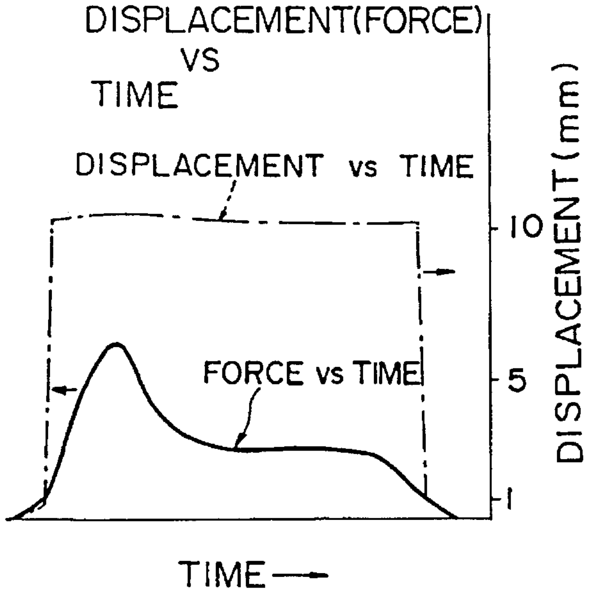
FIG. 5D PRIOR ART

FIG. 4 is a schematic diagram showing an example of an operating device attached with strain gauges. In FIG. 4, the operating device 102 includes an operating member 103 rotatable about a fulcrum 104 and a mass body 108 rotatable about a fulcrum 110 having its right end abutting the operating member 103 in the normal state. Resistive wire strain gauges G are attached to the upper surface of the operating member 103.

Without an external force, the mass body 108 lowers its left end so that the right end lifts the operating member 103 upward.

As a player depresses the operating member 103 with a force F, strains, stresses, and a bending moment are generated on the operating member 103. Strains change the resistances of the strain gauges G.

A bending moment M is a product of a section modulus z and a stress e. The resistance change R of a strain gauge G is proportional to the stress σ. Namely, $$M=z * \sigma$$

$$\sigma=k * \Delta R,$$

where k is a constant.

The bending moment M applied to a strain gauge G is therefore given by:

$$M=z * k * \Delta R \quad (1),$$

where z represents the section modulus of the operating member 103 at the point where the strain gauge G is attached, and k is a constant.

From the force balance, M= F * x where x represents a distance between the position of a finger of a player on the operating member 103 and the strain gauge G.

Even if the same force F is applied to the operating member 103, the moment M changes with the distance x. Because the moment M is proportional to the resistance change ΔR of a strain gauge, a tone signal generated by an electronic musical instrument having the above-described operating member changes with the distance x even with the same force F.

It is desirable for a particular performance style to detect the actual force independently from the force applying position.

Figure 1A:
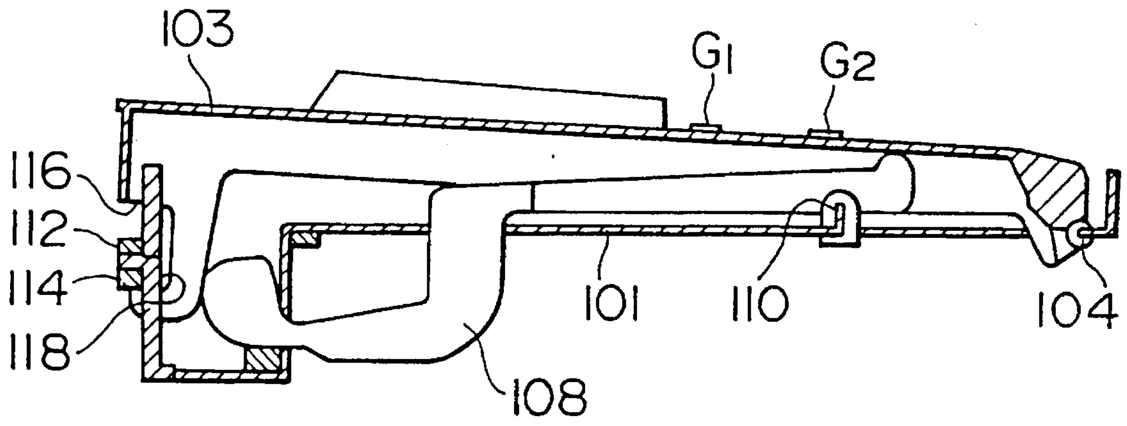
FIGS. 1A and 1B are a cross section and a schematic diagram showing an operating device for an electronic musical instrument according to an embodiment of the present invention.
Figure 1B:
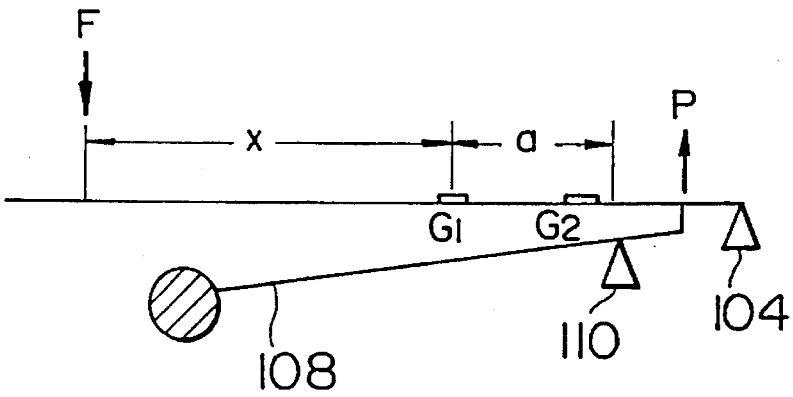

FIGS. 1A and 1B are diagrams showing an operating device for an electronic musical instrument according to an embodiment of the present invention.

Referring to FIG. 1A, the operating device 2 includes an operating member 3 rotatable about a shaft 4 mounted on a support frame 1 and a mass body 8 rotatable about a fulcrum 10 and supported by the support frame 1. The mass body 8 has its right end abutting the operating member 3 in the normal state.

The operating member 3 is made of resilient material providing elastic deformation.

The mass body 8 gives a player a sense of mass when the player touches and depresses the operating member 3, thus providing a touch sense simulating that of a key of a natural musical instrument, such as a piano.

First and second stoppers 12 and 14 are mounted on the support frame 1 at its left end.

The left end portion of the operating member 3 has a channel-shaped recess forming upper and lower contact surfaces 16 and 18. The upper contact surface 16 prevents the operating member 3 from being rotated downward when it contacts the first stopper 12, and the lower contact surface 18 presents the operating member 3 from being rotated upward when it contacts the second stopper 14.

On the left side of the contact point between the operating member 3 and the mass body 8, two resistive wire strain gauges G1 and G2 are attached to the operating member 3, being spaced apart in the longitudinal direction of the operating member 3.

FIG. 1B is a schematic diagram illustrating the embodiment shown in FIG. 1A.

From the moment balance conditions, moments M1 and M2 applied to the strain gauges G1 and G2 are given by:

$$M1= F * x \quad (2)$$

$$M2= F (x+ a) \quad (3).$$

The subtraction of the equation (2) from the equation (3) gives:

$$M2-M1= F * a \quad (4)$$

$$F= (M2-M1) (1/a) \quad (5).$$

From the equation (1), the moments M1 and M2 are:

$$M1= z1 * k1 * \Delta R1 \quad (6)$$

$$M2= z2 * k2 * \Delta R2 \quad (7).$$

where z1 and z2 represent the section moduli of the operating member 3 at the points where the strain gauges G1 and G2 are attached, ΔR1 and ΔR2 represent the resistance changes of the strain gauges G1 and G2, and k1 and k2 represents the constants.

From the equations (5) to (7), the following equation is obtained:

$$F= (z2 * k2 * \Delta R2-z1 * k1 * \Delta R1) (1/a) \quad (8).$$

Assuming that the strain gauges G1 and G2 have the same characteristic, k1= k2, and assuming that the cross sectional shapes are the same, z1= z2. As a result, z1 * k1=z2 * k2= c. Then, the equation (8) is changed to:

$$F=c * (\Delta R2-\Delta R1) (1/a) \quad (9).$$

It is therefore possible to calculate the force F independently from the distance x, by using the outputs ΔR1 and ΔR2 of the strain gauges G1 and G2.

A force indicated by P in FIG. 1B is a reaction force applied from the mass body 8 to the operating member 3.

Figure 2:
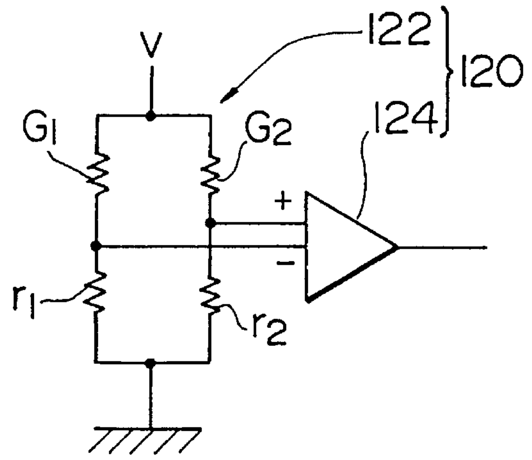
FIG. 2 is a circuit diagram of a differential amplifier which calculates a force F.
Figure 3:
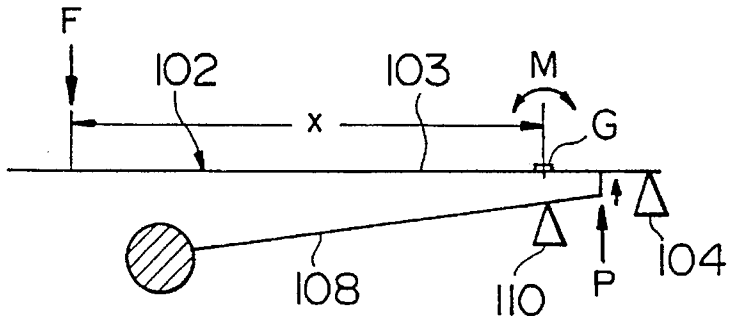
FIG. 3 is a schematic diagram illustrating the dynamics of an operating device.

FIG. 2 is a circuit diagram showing a differential amplifier (tone control means) for obtaining a signal representing the force F.

Referring to FIG. 2, the differential amplifier 20 includes a resistor parallel circuit 22 and an operational amplifier 24. The resistor parallel circuit 22 is a parallel circuit of a serial circuit of a resistor r1 and strain gauge G1 and a serial circuit of a resistor r2 and strain gauge G2. The cross point between the strain gauge G1 and resistor r1 is connected to the inverting input terminal of the operational amplifier 24, and the cross point between the strain gauge G2 and resistor r2 is connected to the non-inverting terminal of the amplifier 24. The resistor parallel circuit 22 and operational amplifier 24 constitute a bridge circuit.

An output of the operational amplifier 24 is the output of the differential amplifier 20. This output corresponds to (ΔR2–ΔR1) which is multiplied by c/a to obtain the force F from the equation (9). In this manner, the applied force can be detected with a simple circuit arrangement, independently from the position of the force applied to the operating member 3.

An output of the differential amplifier is supplied to musical tone signal generator means (not shown). A tone signal generated by the tone signal generator means is supplied to an amplifier to drive loudspeakers.

Means for calculating the force F (musical tone control means) may use a microcomputer instead of a differential amplifier. In this case, outputs of the strain gauges G1 and G2 are supplied to the microcomputer to calculate the force F.

As shown in FIG. 4, strain gauges may be attached to the upper and lower surfaces of the operating member to cancel noises.

Figure 6:
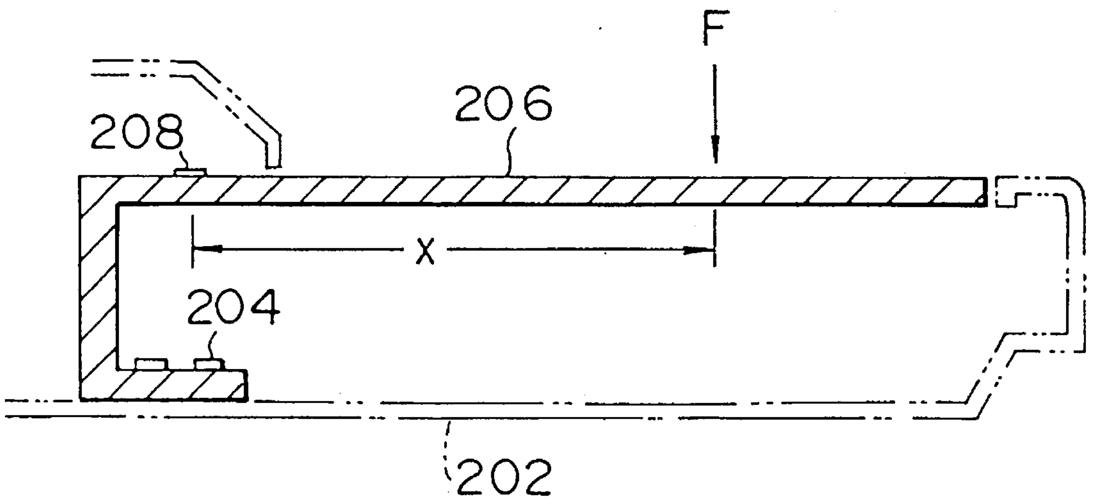
FIG. 6 is a cross section showing the main part of the operating device according to another embodiment of the invention.

FIG. 6 is a cross section showing the main part of the operating device according to another embodiment of the present invention. Referring to FIG. 6, an operating member 206 is fixedly mounted on a frame (a support for the operating member) 202 by fastening members such as bolts 204. Although only one operating member is shown in FIG. 6, actually a plurality of operating members 206 are juxtaposed on the frame 202.

The operating member 206 is made of resilient metal material such as aluminum. The dynamics of the operating member 203 is represented by a cantilever structure wherein one end of the operating member fixed to the frame constitutes the fixed end and the other end constitutes the free end.

As a player depresses the operating member 206 downward, it displaces by the amount proportional to the force applied to the operating member 206.

A resistive wire strain gauge 208 is fixedly attached to the operating member 206. The strain gauge 208 generates an electrical signal corresponding to the displacement of the operating member 206. For example, the strain gauge 208 has a resistance of 100 to 120 Ω with no displacement, and a resistance change of about 0.3 Ω at the displacement of 10 mm at the distal end of the operating member 206.

The bending moment M of the strain gauge 208 is obtained by the following equation same as the equation (1):

$$M= z * k * \Delta R \quad (10),$$

where ΔR represents the resistance change of the strain gauge 208, and z represents the section modulus of the operating member 206. k represents a constant uniquely determined by the modulus of longitudinal elasticity and the Poisson's ratio of the material.

From the force balance conditions, the moment M is given by:

$$M=F * x \quad (11),$$

wherein F represents a depression force, and x represents a distance between the force applied position of the operating member 206 and the strain gauge 208.

From the equations (10) and (11), the following equation is obtained:

$$F= (z * k * \Delta R)/x$$

The depression Force F applied by a player is therefore proportional to an output of the strain gauge 208.

Figure 7:
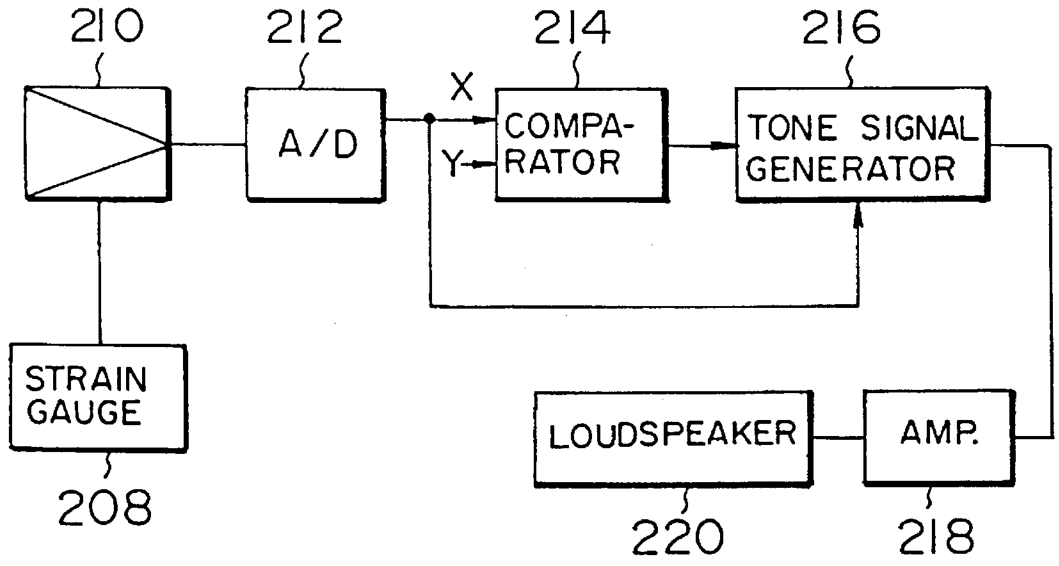
FIG. 7 is a circuit diagram showing the operating device according to another embodiment of the invention.

FIG. 7 is a block diagram of an electronic musical instrument using the operating member of the present invention.

An electrical signal outputted from the strain gauge 208 is amplified by an amplifier 210 and converted into a digital signal by an A/D converter 212. The digital signal X is compared with a threshold value Y by a comparator 214. If the digital signal X is equal to or greater than the threshold value, it is supplied to a musical tone signal generator 216.

The musical tone signal generator 216 has an envelope generator (EG) control terminal, tone effect control terminals such as vibrato effect and reverberation effect terminals, a low pass filter (LPF) control terminal, and other control terminals.

A signal from the A/D converter 12 is supplied to one or more of these control terminals so that a musical tone can be controlled in various ways in accordance with an output of the strain gauge 208.

For example, the tone volume can be controlled by inputting a signal from the A/D converter to the EG control terminal. Various effects can be provided by inputting a signal from the A/D converter to tone effect control terminals. If a signal from the A/D converter is inputted to the LPF control terminal to change the cut-off frequency, a tone color for example can be made brighter the larger the output of the strain gauge 208.

Figure 8A:
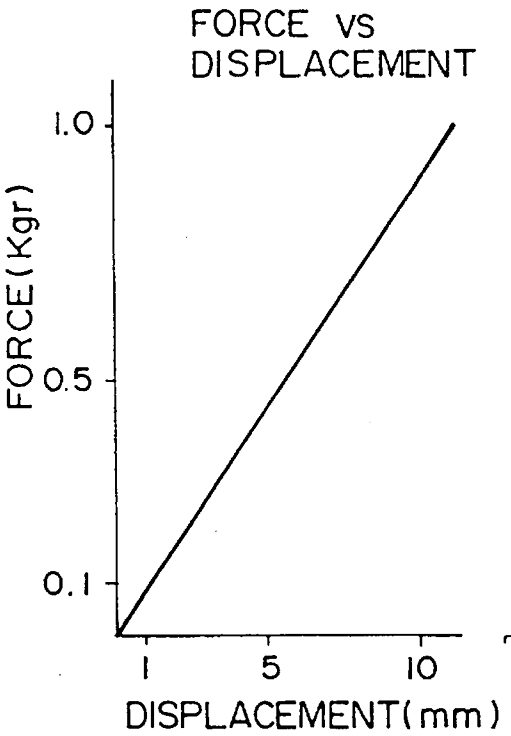
FIGS. 8A and 8B illustrate how the displacement of an operating member is made, FIG. 8A explaining the relationship between a displacement and a depression force applied by a player, and FIG. 8B explaining the relationship between a force and displacement relative to time.
Figure 8B:
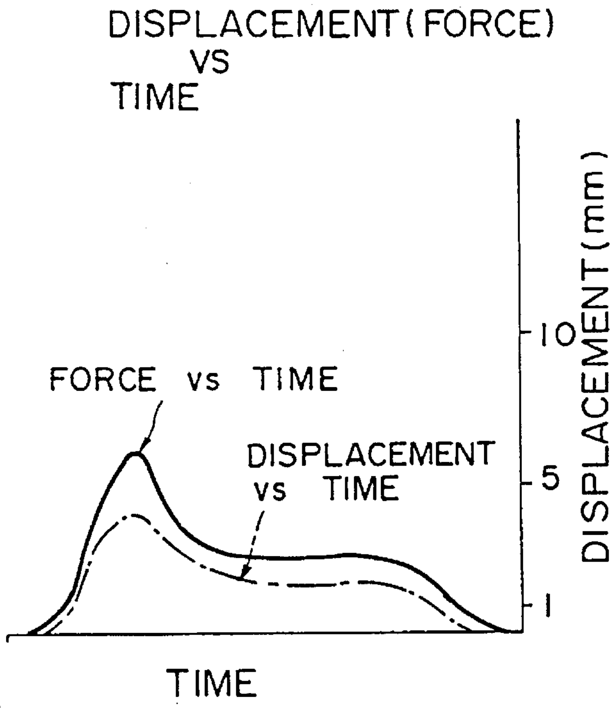

FIG. 8A shows the relationship between the displacement and force applied by a player to the operating member 206 of the embodiment shown in FIG. 6. FIG. 8B shows the relationship between the force applied by a player and time, and the relationship between the displacement detected by the strain gauge 208 and time.

As shown in FIG. 8A, the displacement of the operating member 206 of this embodiment changes generally in proportion to the applied force. As shown in FIG. 8B, the displacement changing with time can be obtained which displacement is proportional to the force changing with time and applied by a player to the operating member 206.

The displacement of the operating member 206 is always proportional to the applied force during the period from immediately after the contact of a finger of a player to the removal of the finger therefrom, so that an output of the strain gauge 208 directly reflects the performance intended by the player.

Figure 9:
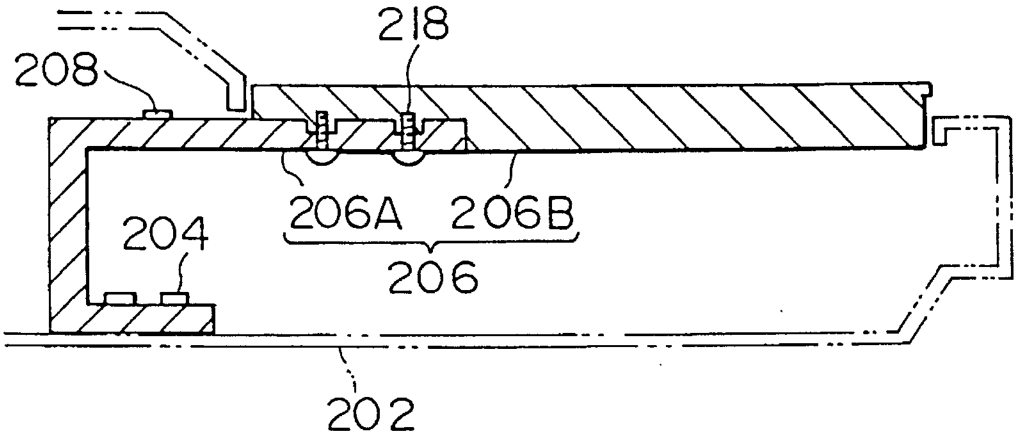
FIG. 9 is a cross section showing the main part of the operating device according to a further embodiment of the invention.

FIG. 9 is a cross section showing the main part of the operating device according to another embodiment of the present invention.

This embodiment differs from the embodiment shown in FIG. 6 in that the operating member 206 of this embodiment is constructed of a support section 206A made of metal such as aluminum and an operating section 206B made of resin and fixed to the support section 206A by fastening members such as screws 218.

The operating member 206 as a whole is of the cantilever structure. Therefore, the displacement of the operating member 206A is proportional to the depression force applied by a player to the operating section 206B. An output of the strain gauge 208 is therefore proportional to the depression force and displacement.

A mechanism allowing the operating section 206B to swing in a predetermined range may be interposed between the support section 206A and operating section 206B. In this case, the operating section 206B provides a predetermined motion (play) amount so that the sense of depression can be given to the operator when depressing the operating section 206B.

Figure 10A:
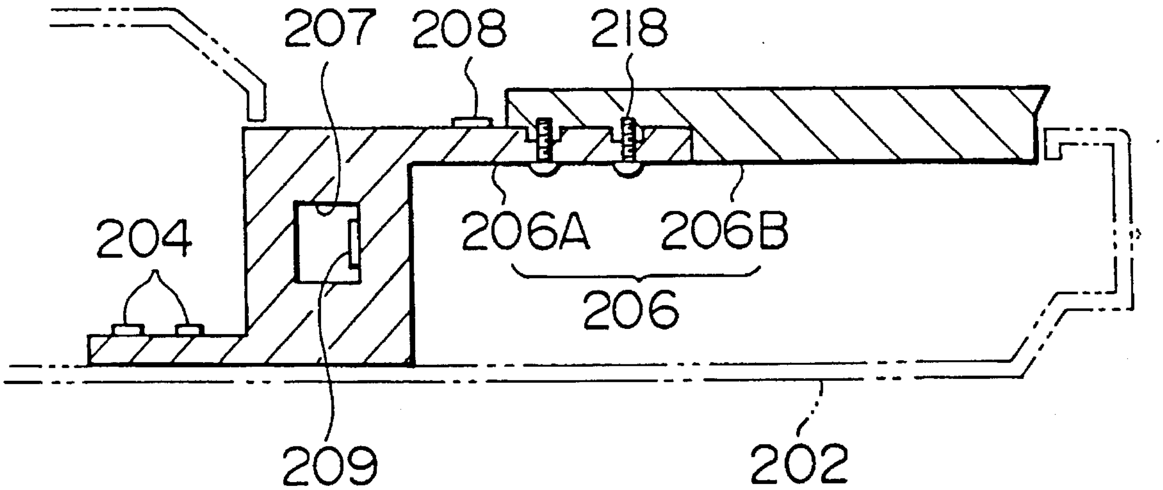
FIG. 10A being a side view in section, and FIG. 10B being a plan view.
Figure 10B:
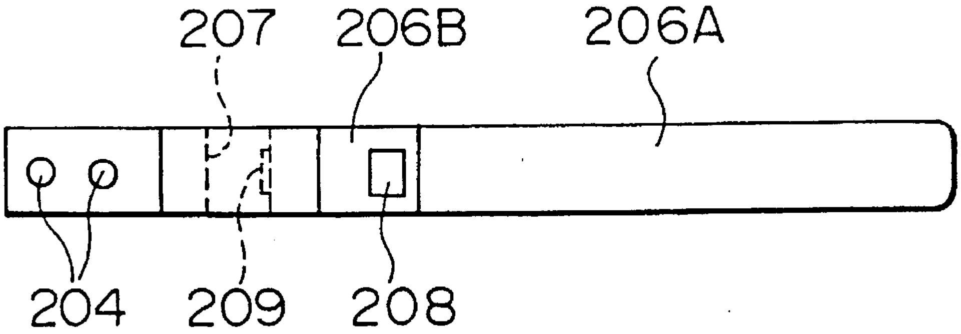
FIG. 10 shows the main part of the operating device according to a still further embodiment of the invention.

FIGS. 10A and 10B show the main part of the operating device according to another embodiment of the present invention. FIG. 10A is an elevational side view in section of the operating device, and FIG. 10B is a plan view.

This embodiment has the following points different from the embodiment shown in FIG. 9, although both have similar points. A rectangular through-hole 207 is formed in the support section 206A, and a resistive wire strain gauge 209 is attached to the wall of the through-hole 207. Another strain gauge 208 is also attached to the upper surface of the support section 206A similar to the embodiment shown in FIG. 9.

The strain gauge 209 detects a force applied to the operating member 207 not in the vertical direction of the member but in the longitudinal direction (in the right and left side direction as viewed in FIG. 10A).

An output of the strain gauge 209 is inputted to the musical tone signal generator via an A/D converter and comparator, separately from an output of the strain gauge 208.

With the operating member of this embodiment, the force not only in the vertical direction but also in the longitudinal direction of the operating member 209 can be used for reproducing a performance given by a player.

Figure 11:
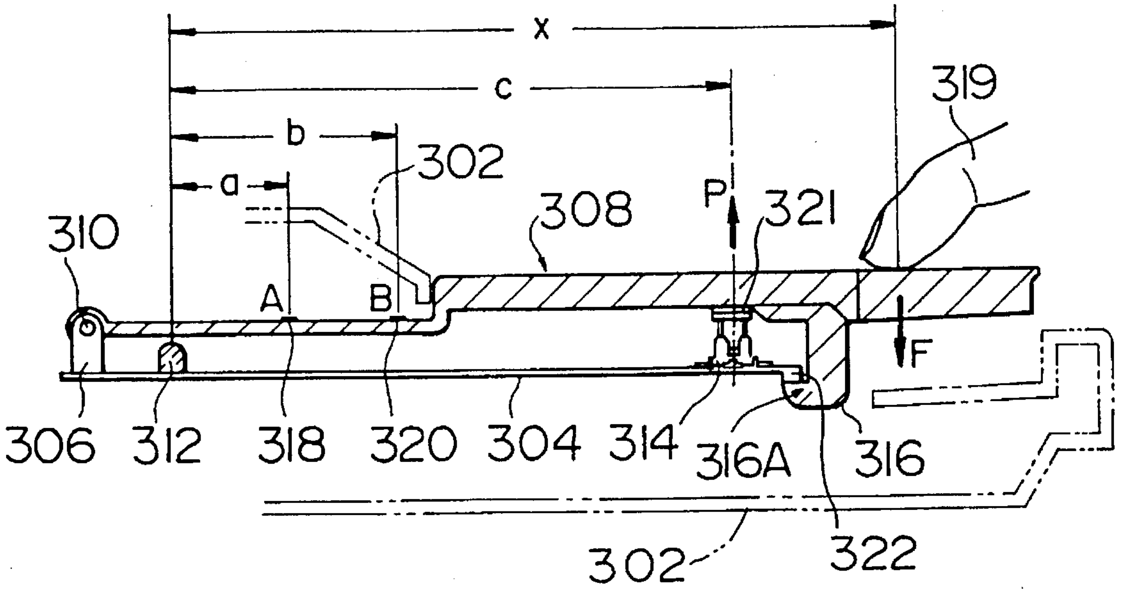
FIG. 11 is a side view of the operating device for an electronic musical instrument according to an embodiment of the invention.

FIG. 11 is a side view in section of the operating device for an electronic musical instrument according to another embodiment of the present invention.

A support plate 304 is mounted on the frame 302 of the electronic musical instrument. A bearing 306 is mounted on the support plate at the left side end. A shaft 310 of an operating member 308 is supported by the bearing 306 to allow the member to be rotatable upward and downward. Although only one operating member 308 is shown in FIG. 11, actually a plurality of operating members 308 are juxtaposed on the support plate 304 like a keyboard.

A key switch 314 is mounted near the right end of the support plate 304. This key switch 314 is a two-make switch having two movable contacts formed on the inner surface of a flexible bulged portion made of resilient rubber and two fixed contacts formed on the support plate. The flexible bulged portion Imparts a reaction force P when the operating member is depressed, to exert a recovery force of the operating member when it is released. In place of the two-make switch, two one-make switches may be used.

A downward projection 316 is formed on the operating member 8 at its right side. The distal end 316A of the projection 316 abuts against a stopper 22 formed on the support plate 304 at its right side to prevent the operating member 308 from further rotating upward.

In the recovery state, the operating member 308 is energized upward by the reaction force P of the key switch 314 so that the distal end 316A of the projection 316 is abutting against the stopper 322 formed on the support plate 304 at its right side. Although the operating member 308 is always energized upward by the reaction force P of the key switch 314 in this embodiment, other resilient means such as a spring may be used to bias the operating member 308 upward.

Two strain gauges 318 and 320 are attached to the operating member 308 at its left side, with a proper distance therebetween being set. A pressure sensor 321 is mounted at the position corresponding to the key switch 314.

A bending stress generating column 12 is formed on the support plate 304 on the left side of the strain gauges 318 and 320 and at the right side position near the bearing 306. This column 12 helps the strain gauges 318 and 320 to operate.

As seen from FIG. 11, the column 312 faces the lower surface of a proximal end portion (left side) of the operating member 308 and forms a small clearance between the lower surface and the top of the column 312, under the condition that the operating member 308 is not actuated and the upward motion of the operating member 308 is being stopped by the abutment of the projection 316A against the stopper 322. This clearance provides a dead zone of the strain gauges 318 and 320 at the initial stage of depressing the operating member 308. This dead zone is suitable for confirming a touch sense of a finger as the player actually depresses the operating member 308 after the player intended to depress it. Even a player familiar with a conventional keyboard with a sufficient dead zone can play without any foreign feeling. However, from the viewpoint of quick learning by a player not accustomed with a keyboard, it is rather desirable that such a dead zone is not provided, as in the case of embodiments shown in FIGS. 9 and 19, 20, and 27.

Figure 12:
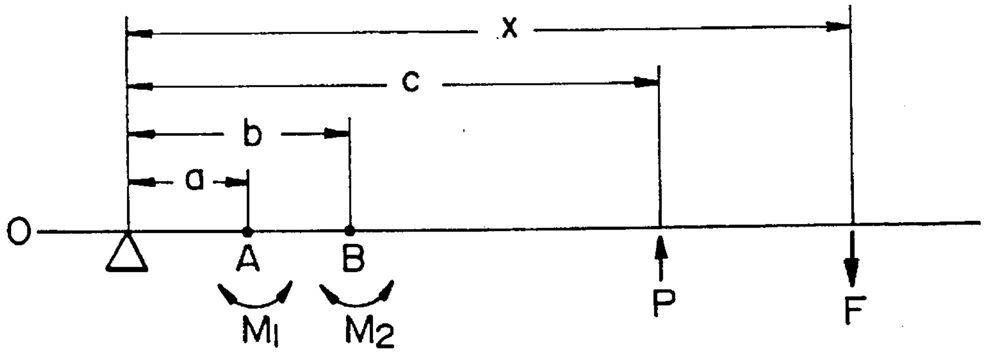
FIG. 12 is a schematic diagram explaining the dynamics of the embodiment shown in FIG. 11.

FIG. 12 explains the dynamics of the embodiment shown in FIG. 11.

The bending moments M1 and M2 at the positions A and B where the strain gauges 318 and 320 are attached are given by using the equation (1) by:

$$M1=z1 * k1 * \Delta R1 \quad (12)$$

$$M2=z2 * k2 * \Delta R2 \quad (13).$$

where ΔR1 and ΔR2 represent the resistance changes of the strain gauges 318 and 320, z1 and z2 represent the section moduli of the operating member 308 at the positions A and B, and k1 and k2 represent constants.

As shown in FIGS. 11 and 12, the distances of the strain gauges 318 and 320 are a and b from the bending moment generating column 312, and the distance of the key switch 314 is c. The distance of the position where a player depresses the operating member 308 with a finger is x. Representing the downward depression force applied by the player to the operating member 308 by F and the reaction force of the key switch by P, the moments M1 and M2 are obtained from the moment balance conditions as:

$$M1=(x-a)\,F-(c-a)\,P \quad (14)$$

$$M2=(x-b)\,F-(c-b)\,P \quad (15).$$

From the equations (14) and (15), the following two equations are obtained:

$$F=P+(M1-M2)/(b-a) \quad (16)$$

$$x=a+[(b-a)\,M1+(b-a)(c-a)]/\,[M1-M2+P\,(b-a)] \quad (17).$$

The force F and position x can be calculated from the resistance changes ΔR1 and ΔR2 given by the outputs of the strain gauges 318 and 320 and the force P given by the output of the pressure sensor 312. If the reaction force P changes less during the rotation of the operating member 308, this force P can be considered as a constant, allowing to omit the pressure sensor 321.

Figure 13A:
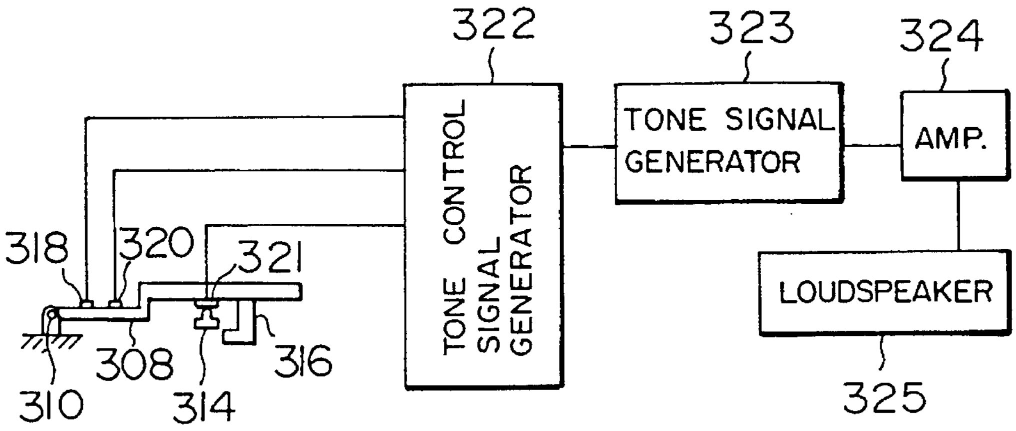
FIGS. 13A and 13B are block diagrams of an electronic musical instrument assembled with the operating devices of the embodiment shown in FIG. 11, FIG. 13A being a block diagram showing the whole structure of the musical instrument, and FIG. 13B showing a physical sound source model of the musical tone signal generator for a wind instrument.

FIG. 13A is a block diagram showing an electronic musical instrument assembled with the operating device shown in FIGS. 11 and 12.

The outputs of the strain gauges 318 and 320 and the pressure sensor 321 are inputted to a musical tone control signal generator 322. The tone control signal generator 322 is constituted by a CPU, a ROM which stores programs, and a RAM assigned with various registers. The tone control signal generator 322 calculates the output values of the strain gauges 318 and 320 and the pressure sensor 321 and controls a musical tone signal generator 323 in accordance with the calculated values. In response to an instruction from the musical tone control signal generator 322, the tone signal generator 323 generates a tone signal to produce a musical tone via an amplifier 324 and loudspeakers 325.

Figure 13B:
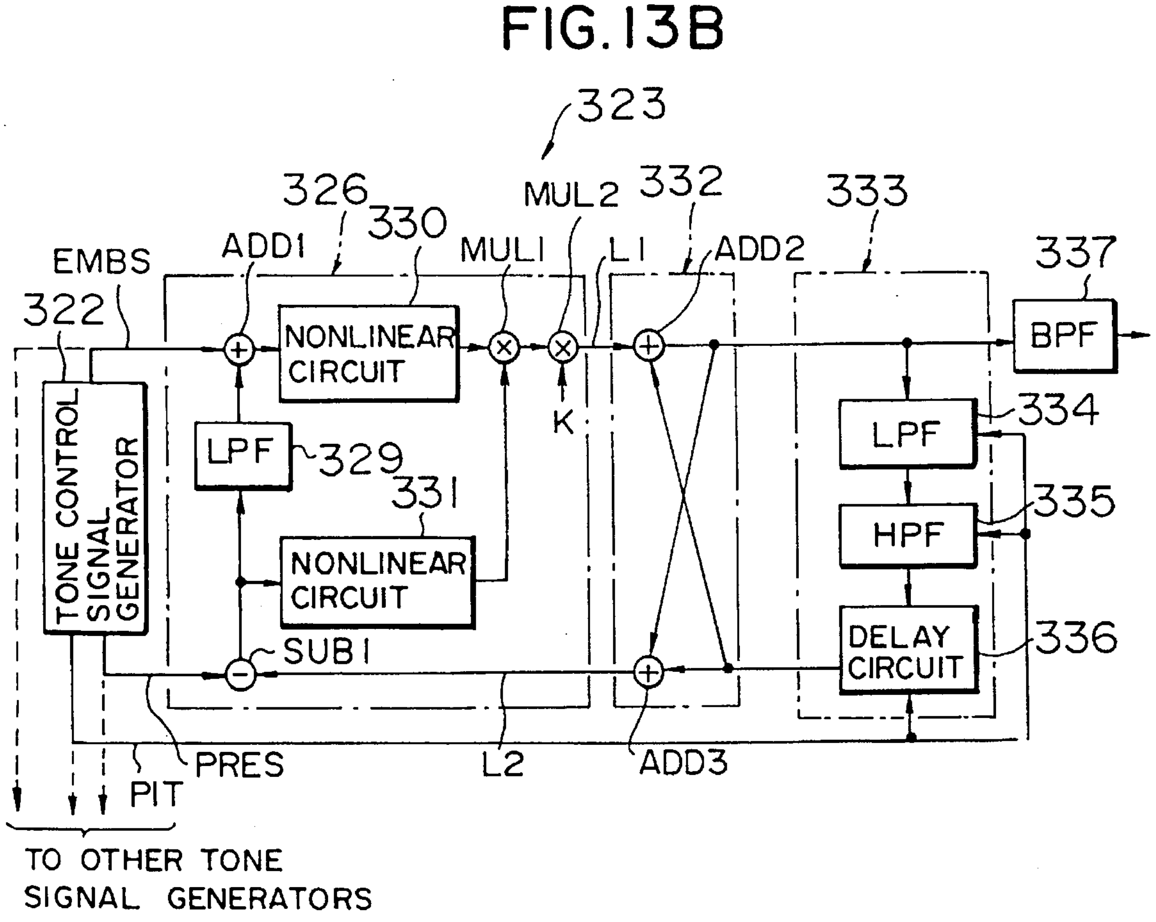

FIG. 13B shows an example of the musical tone signal generator 323. This generator 323 uses the force F as a breath pressure signal (PRES) representing a breath pressure applied to a wind instrument, and uses the position x where the force F is applied as an embouchure signal (EMBS) representing the lip parameters such as the shape and tightening of lips during a performance. The tone signal generator 323 is disclosed in Japanese Patent Laid-open Publication No. 2-294693 which is incorporated herein by reference.

Referring to FIG. 13B, the tone signal generator 323 has a loop circuit including a tone control signal input unit 326, a waveform signal junction unit 332, and a waveform signal transmission unit 333. The tone control signal input unit 326 has a subtracter SUB1 which subtracts the breath pressure signal (PRES) from the waveform signal supplied from a signal line L2 to output a synthesized signal of both the signals.

Figure 14A:
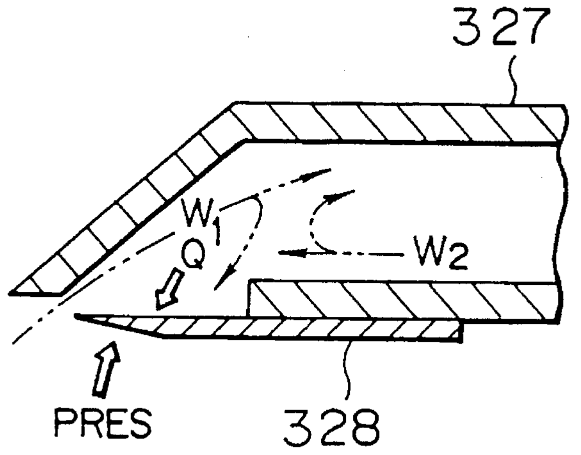
FIGS. 14A to 14C are diagrams explaining the characteristic of the musical tone signal generator shown in FIG. 13B, FIG. 14A being a cross section of a wind instrument as a natural musical instrument, FIG. 14B showing an input/output characteristic of one nonlinear circuit used by the musical tone signal generator, and FIG. 14C showing an input/output characteristic of the other nonlinear circuit.

FIG. 14A is a cross section of a natural musical instrument, i.e., a wind instrument. Referring to FIG. 14A, the waveform signal from the signal line L2 represents a reflected wave W2 returned from a resonance pipe of the wind instrument back to a mouth piece 327. A reed 328 displaces in accordance with a pressure difference between the breath pressure PRES and the pressure Q of the reflected wave W2 transmitted from the resonance tube to the mouth piece 27. In accordance with this displacement, an incident wave W1 is generated. An output of the subtracter SUB1 is supplied to a low pass filter 329 which removes the high frequency components of the pressure difference signal. This filter 329 is used in order for the reed 328 having a specific frequency characteristic not to respond to high frequency components. An output of the low pass filter 329 is supplied to an adder ADD1 which adds the embouchure signal EMBS to the output of the low pass filter and outputs an added signal to a nonlinear circuit 330. This addition of the embouchure signal EMBS simulates a correction of the lip parameters such as the shape and tightening, relative to the displacement of the reed 328 caused by the pressure difference.

Figure 14B:
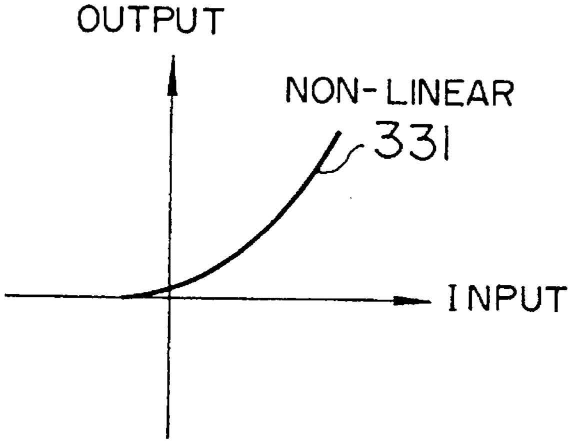

Another nonlinear circuit 331 simulates the nonlinear bending of the reed 328 relative to the applied force, i.e., the displacement of the reed 328. For example, the nonlinear circuit 331 has an input/output characteristic shown in FIG. 14B. An output of the nonlinear circuit 331 is a signal representing an air passage area of the mouth piece 327 at the reed 328 portion. An output of the nonlinear circuit 31 is supplied to one input of a multiplier MUL1.

Figure 14C:
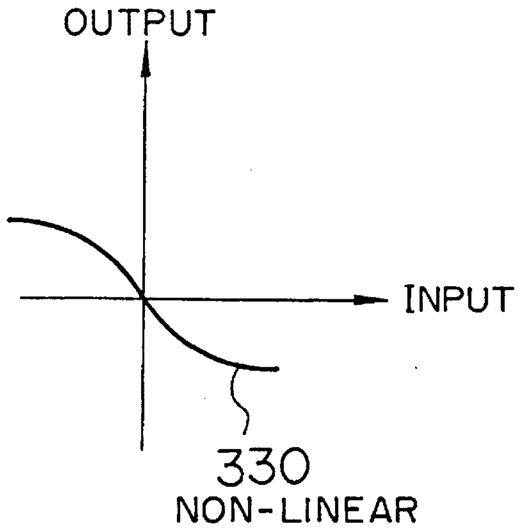

To the other input of the multiplier MUL1, the pressure difference from the adder ADD1 is supplied via the nonlinear circuit 330. This nonlinear circuit 330 simulates that the pressure difference becomes inversely proportional to the breath velocity because the velocity saturates in a narrow pipe even at a large pressure difference. The nonlinear circuit 330 has an input/output characteristic such as shown in FIG. 14C.

In this manner, a pressure difference signal corrected by taking into consideration the influence, to the breath velocity, of the pressure diffferenee in the mouth piece 327 at the reed 328 portion, is applied to the other input of the multiplier MUL1. The multiplier MUL1 multiplies the signal representing the air passage area at the reed 328 portion by the corrected pressure difference signal. An output signal of the multiplier MUL1 is a signal representing the breath velocity in the mouth piece 327 at the reed 328 portion.

An output of the multiplier MU1 is supplied to one input of another multiplier MUL2. This multiplier MUL2 multiplies the signal representing the breath velocity by a fixed coefficient K representing the impedance (breath resistance) in the mouth piece 327. The multiplied result is supplied as a sound pressure signal to the waveform signal junction unit 332 via a signal line L1.

The waveform signal junction unit 332 has adders ADD2 and ADD3 interposed on the respective signal lines L1 and L2. The adder ADD2 adds together two waveform signals supplied from the signal lines L1 and L2, and outputs the added signal to the signal line L1. The adder ADD3 adds together two waveform signals supplied from the signal lines L1 and L2, and outputs the added signal to the signal line L2. In this manner, as illustrated in FIG. 14A, it is possible to simulate the incident wave W1 immediately after the gap between the mouth piece 327 and reed 328, the reflected wave W2 from the resonance pipe, and the pressure Q of the synthesized wave of both the waves W1 and W2.

The waveform signal transmission unit 333 feeds the waveform signal on the signal line L1 back to the signal line L2. On this feedback path, there are interposed a low pass filter 334, a high pass filter 335, and a delay circuit 336. The low pass filter 334 and high pass filter 335 basically simulate the shape of the resonance pipe. The cut-off frequencies are changed in accordance with a pitch signal PIT representing the pitch of a musical tone.

The delay circuit 336 simulates the manner how the incident wave to the mouth piece 327 is returned back again to the mouth piece in accordance with the length of the resonance pipe and the length from the end of the resonance pipe to a tone hole. The delay time of this delay circuit 336 is variably controlled by the pitch signal PIT so that the resonance frequency of the circulating waveform signal becomes in correspondence with the pitch of a musical tone to be generated.

A band pass filter 337 is connected to the signal line L1 to simulate the radiation characteristic of a musical sound in the air.

Figure 15A:
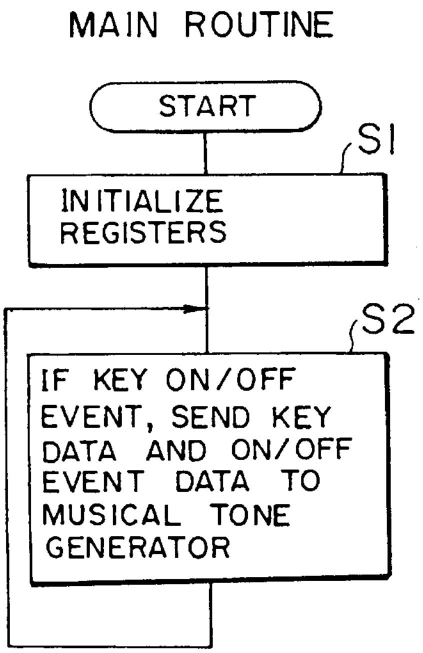
FIGS 15A and 15B are flow charts explaining the operations of the musical tone control signal generator, FIG. 15A showing the main routine, and FIG. 15B showing the timer interrupt routine.
Figure 15B:
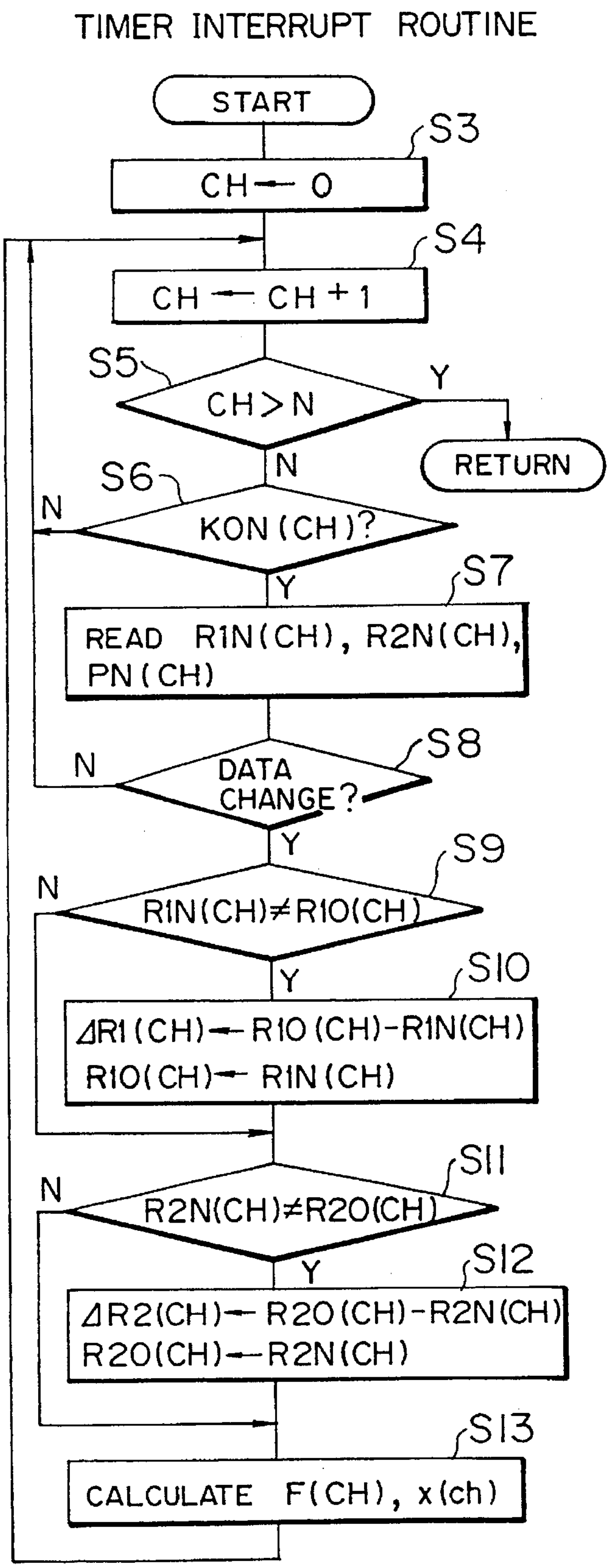

FIGS. 15A and 15B are Flow charts explaining the operation to be executed by the musical tone control signal generator 322. This program explained by the flow charts includes a main routine shown in FIG. 15A and a timer interrupt routine shown in FIG. 15B.

At step S1 of the main routine, various registers are initialized. The registers include a register CH indicating the number of the channel (tone generator) presently processed, a register indicating whether an operating member assigned to each channel has been actuated, registers R1N(CH), R2N(CH), and PN(CH) for storing data from the strain gauges 318 and 320 and the pressure sensor 321 of each channel, registers R10(CH), R2N(CH), and R0(CH) for storing the data immediately before the data stored in the registers R1N(CH), R2N(CH), and PN(CH), and other registers.

The flow charts shown in FIGS. 15A and 15B are written on the assumption that there are a plurality of registers CH, namely, there are a plurality number N of tones to be generated at a time. Although a natural instrument, reed instrument, is a single tone generation instrument generating a single tone at a time, the main routine shown in FIG. 15A is written to allow a plurality of tones to be generated at a time, such as in the case of a keyboard type input device.

Next, keys corresponding to embodiment operating members are scanned at Step S2. If there is a key-on event or key-off event, the data together with the key-on signal or key-off signal is supplied to the musical tone signal generator 323.

In the foregoing description, only one musical tone signal generator 323 has been explained. As shown in the flow chart of FIG. 15A, there are actually provided generators 323 as many as the number N of channels, i.e., the number of tones to be processed at a time. Signals from keys are processed by the tone control signal generator 322 made of a microcomputer or the like and supplied to tone signal generators 323 of corresponding channels. As these musical tone signal generators 323, a time sharing circuit may be used for processing a plurality of tones.

Next, the timer interrupt routine will be described with reference to FIG. 15B. A timer interrupt occurs, for example, every 10 msec.

Upon the start of this routine, "0" is stored in the register CH at Step S3. At Step S4, the contents of the register CH are incremented. At Step S5, it is checked whether the value of the register CH is greater than the number N of channels (the number of musical tone signal generators 323). If greater, the timer interrupt routine returns to the main routine. If not greater, the routine advances to Step S6 whereat it is checked whether there is data of the key assigned to the channel indicated by the value of the register CH (it is checked whether there is a key-on event). If there is no data, the flow returns to Step S4, and if there is data, the flow advances to Step S7.

At step S7, data of the strain gauges 318 and 320 and the pressure sensor 321 is stored in the registers R1N(CH), R2N(CH), and PN(CH), At Step S8 it is checked whether the data is different from preceding data stored in the registers R10(CH), R20(CH), and R0(CH). If different, the flow advances to Step S9, and if not different, the flow returns to Step S4.

It is checked at Step S9 whether data in the register R1N(CH) is different from the preceding data stored in the register R10(CH). If different, a change amount ΔR1(CH) is calculated at Step S10 to store the value of the register R1N(CH) in the register R10(CH) to update it. If not different, Steps S9 and S10 are bypassed. At Steps S11 and S12, the same calculation and updating are executed for the register R2N(CH). Lastly at Step S13, F(CH) and x(CH) are calculated from the equations (12) to (17). The above operation is repeated as many times as the number of channels, and thereafter the main routine resumes.

Figure 16:
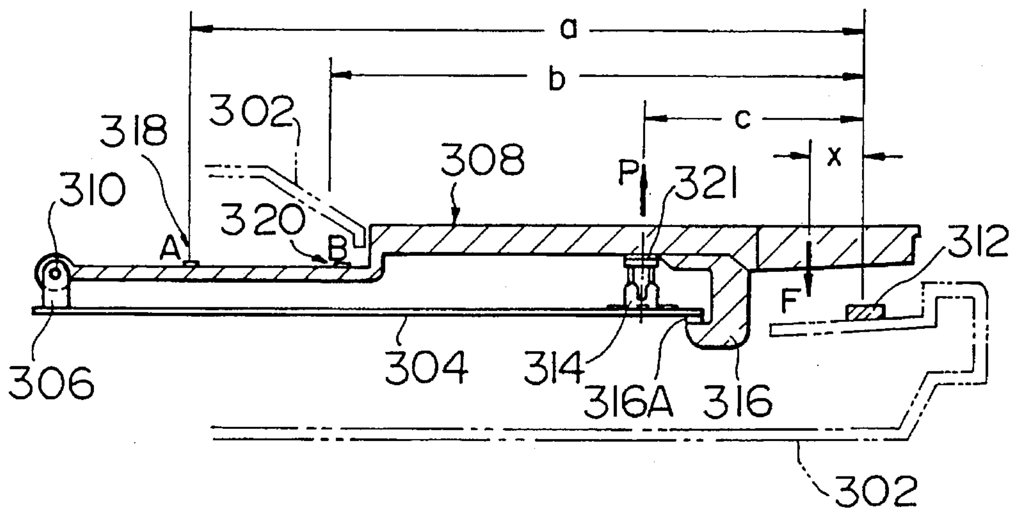
FIG. 16 is a side view of the operating device for an electronic musical instrument according to another embodiment of the invention.

FIG. 16 is a side view of the operating device for an electronic musical instrument according to another embodiment of the invention.

The different point of this embodiment from the embodiment shown in FIG. 11 is that a bending stress generating column 312 is mounted on a frame 302 on the right side of a key switch 314. The other elements are the same as those of the embodiment shown in FIG. 11.

Figure 17A:
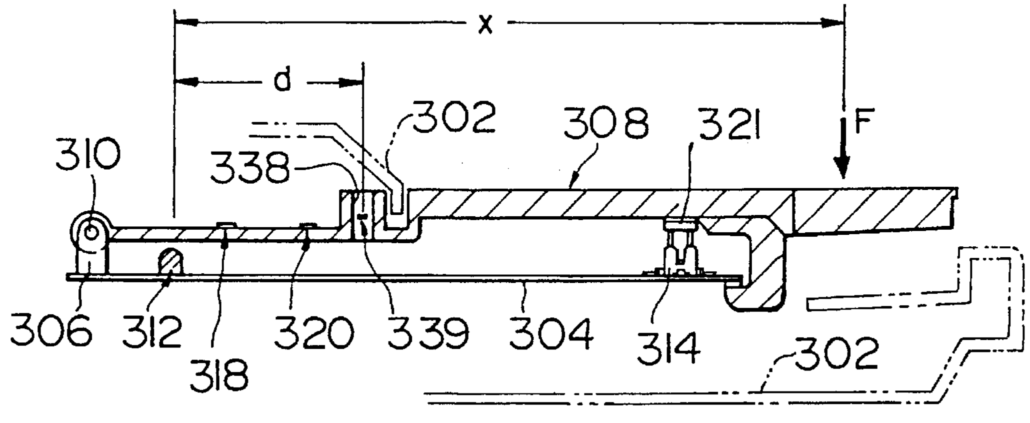
FIGS. 17A and 17B show the operating device for an electronic musical instrument according to another embodiment of the invention, FIG. 17A being a side view, and FIG. 17B being a plan view showing the main part.
Figure 17B:
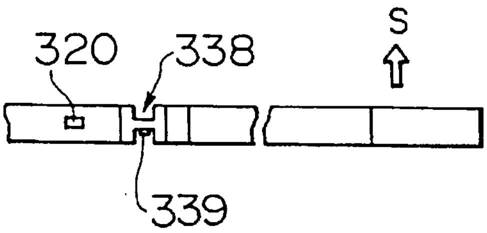

FIGS. 17A and 17B show the operating device for an electronic musical instrument according another embodiment of the invention. FIG. 17A is a side view, and FIG. 17B is a plan view showing the main part of the embodiment.

In this embodiment, recesses 338 are formed in the lateral direction of an operating member 308 so that the bending rigidity of the operating member 308 is made small in the lateral direction (in the up/down direction as viewed in FIG. 17B). A strain gauge 339 is attached to the wall of the recess 338. The wall is perpendicular to the surface on which other strain gauges 318 and 320 are attached. Other elements are the same as those of the embodiment shown in FIG. 11.

In this embodiment, the bending moment M3 in the lateral direction at the position of the strain gauge 339 can be detected. The lateral force S is given by:

$$S=M3/(x-d) \quad (18),$$

where x is the distance between the bending stress generating column 312 and the position of a finger of a player on the operating member, the distance being calculated by using the equations (12) to (15) and (17). d is the distance between the bending stress generating column 312 and the strain gauge 339.

Figure 18:
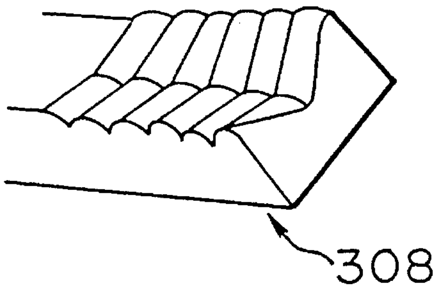
FIG. 18 is a perspective view showing only the distal end portion of the operating member which is a modification of the operating member shown in FIGS. 17A and 17B.

FIG. 18 shows a modification of the operating member 308 shown in FIGS. 17A and 17B. FIG. 18 shows only the distal end portion of the operating member 308. Corrugations are formed on the upper surface of the distal end portion of the operating member 308. Even if a force is applied in the lateral direction, the finger is prevented from sliding on the operating member 308 because of a friction force between the finger and the corrugations, providing a reliable actuation of the member 308.

Figure 19:
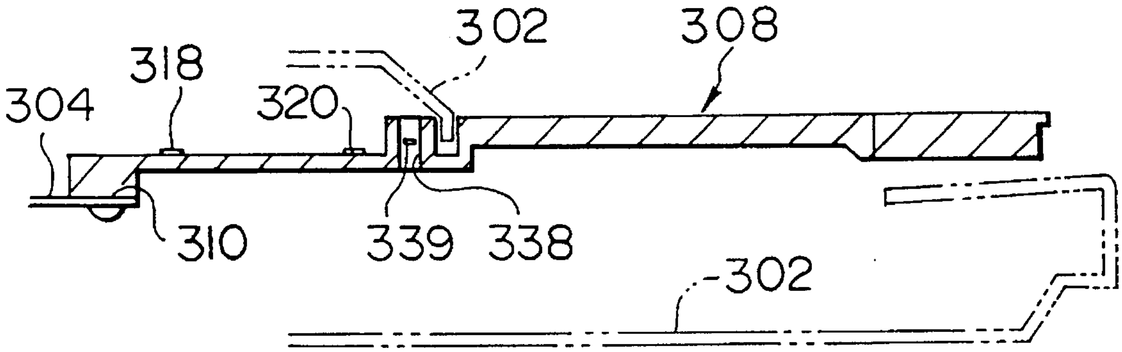
FIG. 19 the operating device for an electronic musical instrument according to another embodiment of the invention.

FIG. 19 shows the operating member for an electronic musical instrument according to another embodiment of the invention. The different points of the embodiment from that shown in FIG. 17 are as follows. The fixed end 310 of an operating member 308 is fixed to a support plate 304. Neither a key switch nor stoppers For restricting the upward and downward rotation of the member 308 is used.

Figure 20:
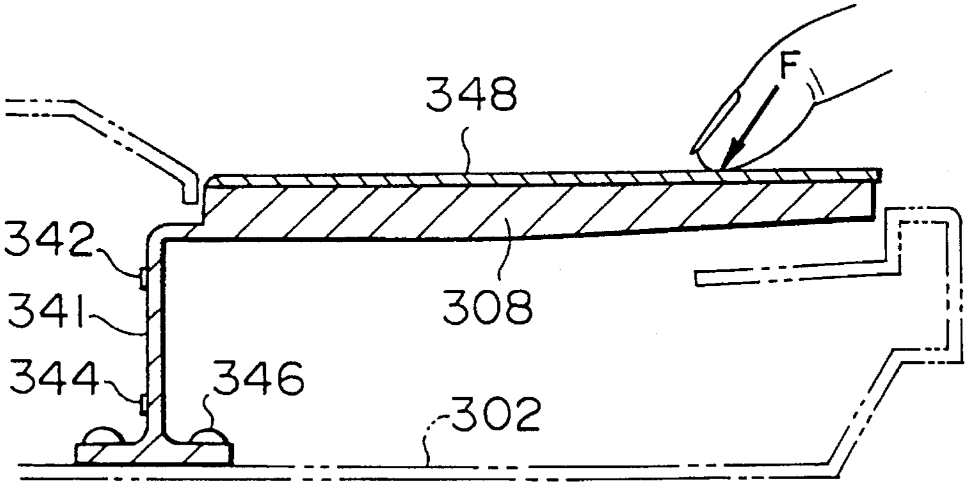
FIG. 20 shows the operating device for an electronic musical instrument according to another embodiment of the invention.

FIG. 20 shows the operating device for an electronic musical instrument according to another embodiment of the invention. In this embodiment, an operating member 308 is of an L-character shape and has an upright section 341 fixed to a frame 302 by fastening members such as bolts 346. Two strain gauges 342 and 344 are attached to the back wail of the upright section 341. The gauges 342 and 344 may be attached to the front wall of the upright section 341.

Figure 21:
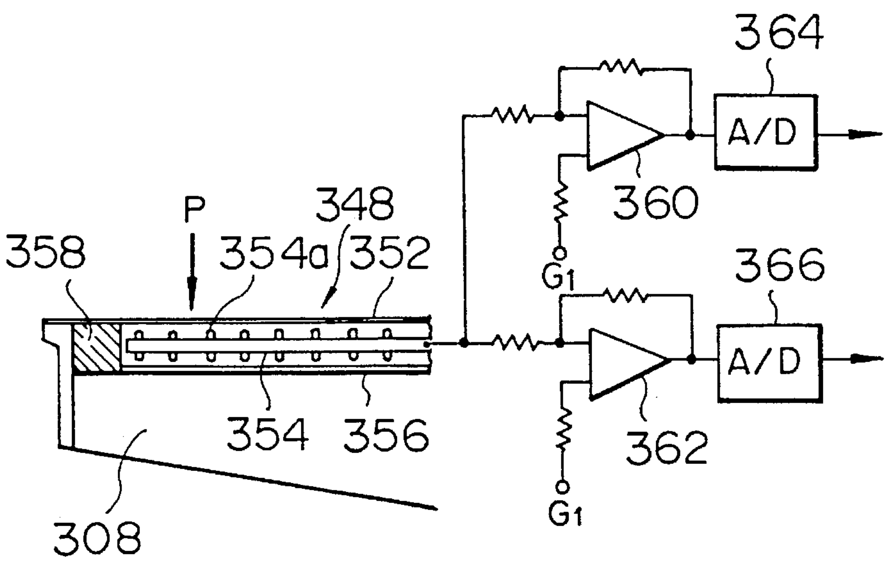
FIG. 21 is a cross section explaining the depression position detector of the embodiment shown in FIG. 20.

A depression position detector 348 is provided covering almost the whole upper surface of the operating member 308. As the depression position detector 348, an element disclosed in Japanese Utility Model Laid-open Publication No. 2-131793 may be used which is incorporated herein by reference. The depression position detector 348 will be described with reference to FIG. 21 and FIGS. 22A and 22B.

The depression position detector 348 formed on the upper surface of the operating member 308, includes an upper resistive sheet 352, a conductive sheet 354, and a lower resistive sheet 356. The conductive sheet 354 is formed with insulating projections 354*a* at the upper and lower surfaces in the X- and Y-directions at an equal interval. A spacer 358 made of, for example, urethane is interposed between the upper resistive sheet 352 and the lower resistive sheet 356.

As a force P is applied, the upper and lower resistive sheets 352 and 356 sandwiching the conductive sheet 354 curve downward and become in contact with the conductive sheet 354 at the position the force P is applied.

Figure 22A:
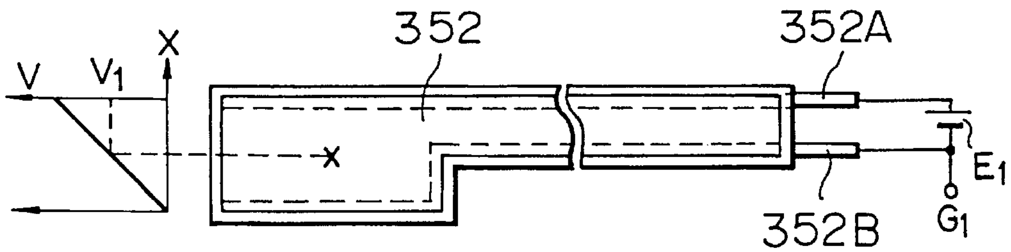
FIGS. 22A and 22B are broken plan views showing the depression position detector of the embodiment shown in FIG. 20, FIG. 22A showing the upper resistive sheet, and FIG. 22B showing the lower resistive sheet.

As shown in FIG. 22A, two electrodes 352A and 352B are connected to the upper resistive sheet 352 covering the operating member 308, at both the opposite sides of the sheet 352 along the longitudinal direction (Y-direction).

Figure 22B:
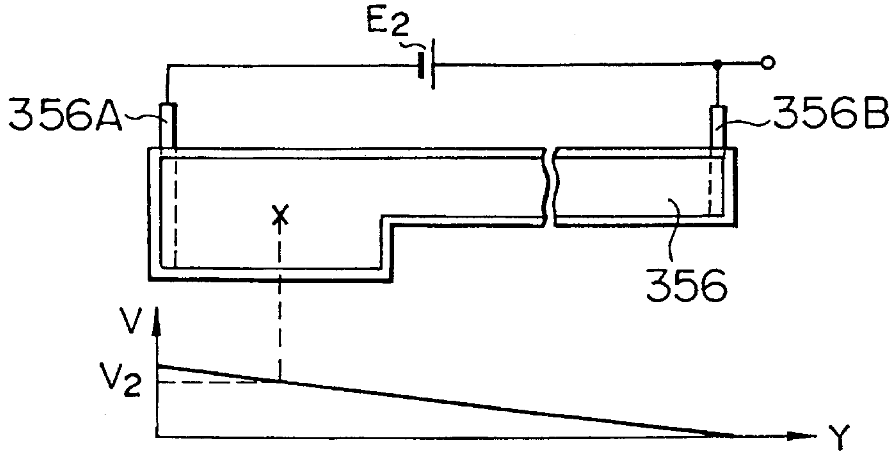

As shown in FIG. 22B, two electrodes 356A and 356B are connected to the lower resistive sheet 356 covering the operating member 308 at both the opposite sides of the sheet 356 along the lateral direction (X-direction). A voltage source E1 is connected between the two electrodes 352A and 352B, and another voltage source E2 is connected between the two electrodes 356A and 356B.

Two amplifiers 360 and 362 are connected to the conductive sheet 354. The reference voltage of the amplifier 360 is supplied from the negative electrode of the voltage source E2 connected to the lower resistive sheet 356. The reference voltage of the amplifier is supplied from the negative electrode of the voltage source E1 connected to the upper resistive sheet 352. These amplifiers 360 and 362 amplify a d.c. voltage appearing on the conductive sheet 354 when a finger of a player contacts the surface of the operating member 308.

Outputs of the amplifiers 360 and 362 are A/D converted by A/D converters 364 and 366 and outputted as coordinate data KX in the X-direction and coordinate data KY in the Y-direction. These data KX and KY are inputted to a musical tone signal generator 328 to be described later.

Figure 23:
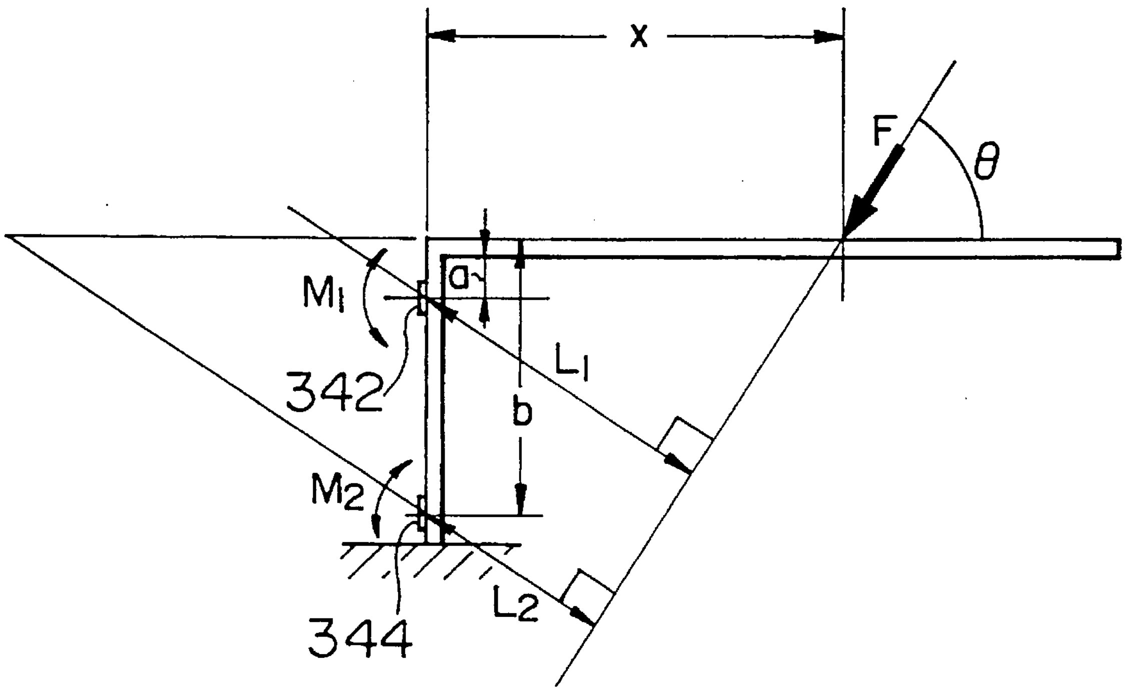
FIG. 23 is a schematic diagram explaining the dynamics of the embodiment shown in FIG. 20.

Referring to FIG. 23 showing the dynamics of the embodiment shown in FIG. 20, a depression force F applied by a player with a finger and the direction h of the force F will be explained.

Representing the distances between the upper surface of the operating member 308 and the strain gauges 342 and 344 by a and b, and representing the distances between the strain gauges 342 and 344 arid an extension line of the force F by L1 and L2, then:

$$L1=x\sin\theta-a\cos\theta \quad (19)$$

$$L2=x\sin\theta-b\cos\theta \quad (20).$$

The bending moments M1 and M2 applied to the strain gauges 342 and 344 are therefore given by:

$$L1=(x \sin\theta - a \cos\theta) F \quad (21)$$

$$L2=(x \sin\theta - b \cos\theta) F \quad (22).$$

The angle θ is obtained by erasing from the equations (21) and (22):

$$\theta=\tan^{-1}[(M1b-M2a)/x(M1-M2)] \quad (23).$$

The force F can be calculated by substituting the angle θ in the equation (22).

Figure 24A:
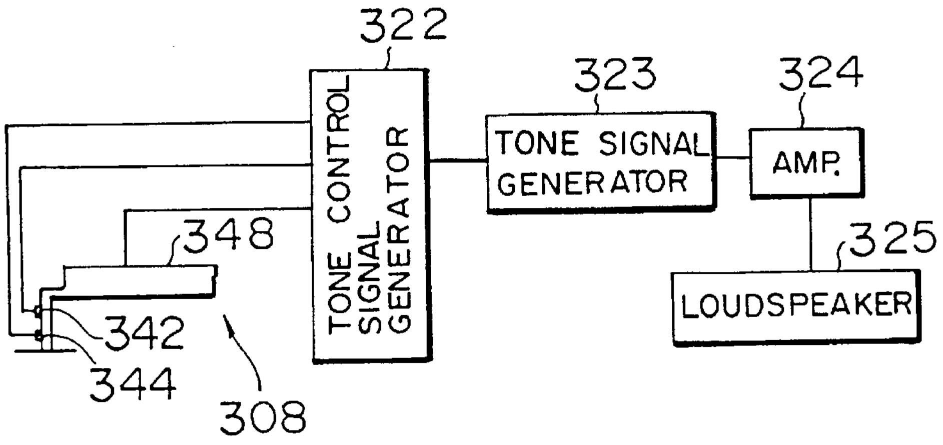
FIGS. 24A and 24B show an electronic musical instrument using the operating device one the embodiment shown in FIG. 20, FIG. 24A being a block diagram, and FIG. 24B being a circuit diagram of the musical tone signal generator.

FIG. 24A is a block diagram of an electronic musical instrument using the embodiment shown in FIG. 20.

Outputs of the strain gauges 342 and 344 and the depression position detector 348 are inputted to a tone control signal generator 322. The generator 322 is constituted by a CPU, a ROM which stores programs, and a RAM assigned with various registers. The generator 322 calculates the input values and controls the musical tone signal generator 323 in accordance with the calculated results. In response to an instruction from the tone control signal generator 322, the tone signal generator 323 generates a tone signal to produce a musical tone via an amplifier 324 and loudspeakers 325.

Actually, a plurality of operating members 308 are used in the electronic musical instruments.

Figure 24B:
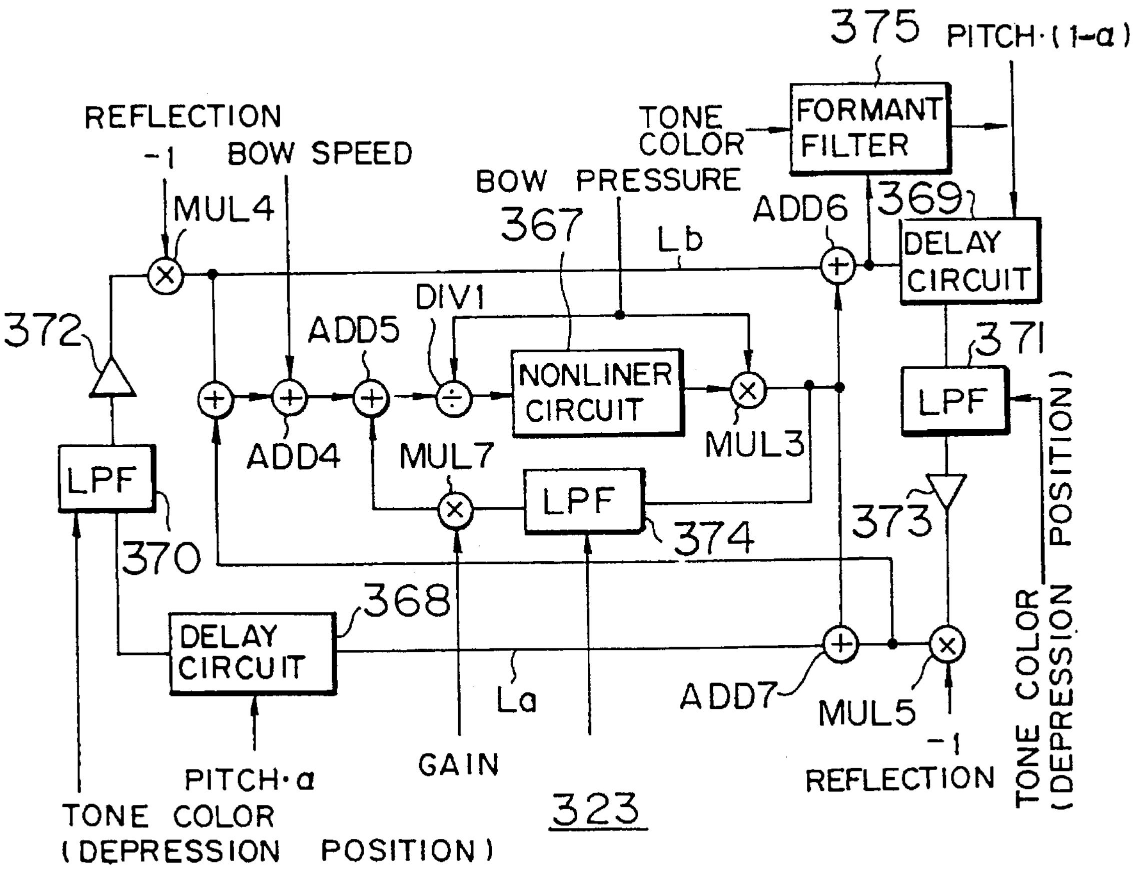

FIG. 24B shows a sound source model for a stringed instrument using a bow such as a violin, the model being disclosed in U.S. Ser. No. 07/628,324 which is incorporated herein by reference.

The sound source model used as the musical tone signal generator 323 will be described.

For the musical tone signal generator shown in FIG. 24A, a signal for generating a musical tone is given by a bow speed. A signal for controlling the characteristic of a nonlinear circuit 367 is given by a bow pressure. A parameter for designating a pitch is determined by a selected one of a plurality of operating members 308. The bow speed and pressure information is given by the depression direction θ and force F of each operating member actuated by a player.

The depression position x of a finger of a player can be related to the position of a bow to use it as tone color information.

As the operating member 308 is depressed by a player, a bow speed signal is inputted to an adder ADD4. This initial bow speed signal is supplied via an adder ADD5 and divider DIV1 to the nonlinear circuit 367 which provides a nonlinear characteristic of each string of the violin.

Figure 25A:
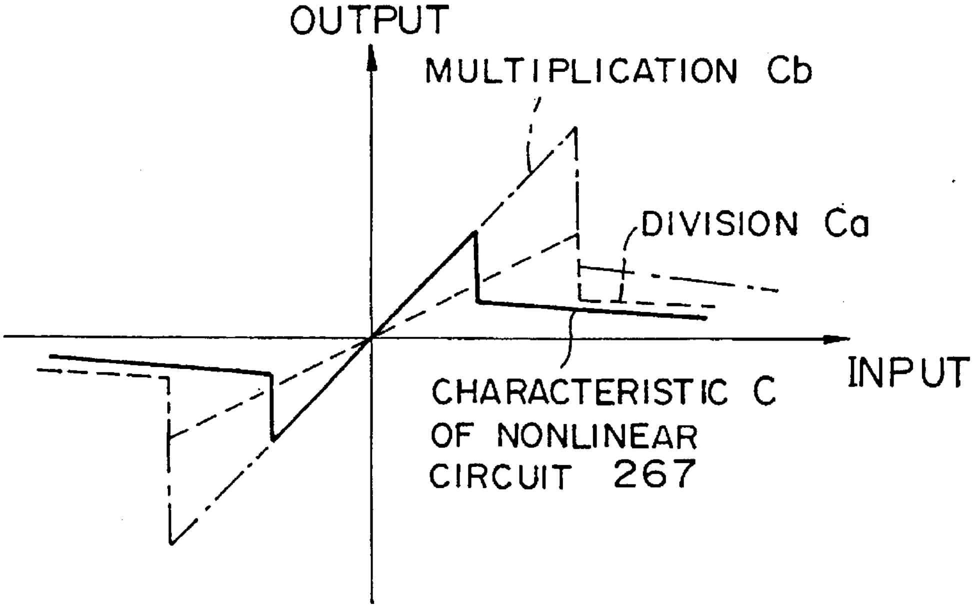
FIGS. 25A and 25B show the characteristic of the electronic musical instrument shown in FIG. 24A, FIG. 25A showing the characteristic of the nonlinear circuit, and FIG. 25B showing the hysteresis characteristic of the motion of a string.

As shown in FIG. 25A, the characteristic C of the nonlinear circuit 367 has two regions, one region from the origin to a certain level being generally linear and the other region outside of the one region having a different characteristic. While the string of a stringed instrument such as a violin is drawn with a bow at a low speed, the displacement of the string and that of the bow are generally the same, and the motion of the string can be represented by using a static friction coefficient. This characteristic corresponds to the linear region from the origin to the certain level. When the bow speed relative to a string exceeds a certain value, the bow speed becomes different from the string displacement speed. Namely, a dynamic friction coefficient becomes dominant over the static friction coefficient. A change from the static friction coefficient to the dynamic friction coefficient corresponds to the steps in the characteristic C of the nonlinear circuit 367.

Referring back to FIG. 24B, an output of the nonlinear circuit 367 is supplied to two adders ADD6 and ADD7 via a multiplier MUL3.

The divider DIV1 on the input side of the nonlinear circuit 367 and the multiplier MUL3 on the output side receive the bow pressure signal and change the characteristic of the nonlinear circuit 367. The divider DIV1 divide an input signal to make it have a small value. As shown by a broken line Ca in FIG. 25A, the divider DIV1 changes a large input value to a small value and outputs it.

The multiplier MUL3 on the output side makes an output of the nonlinear circuit 367 have a large value. Namely, as shown by a one-dot-chain line Cb in FIG. 25A, the characteristic Ca formed by the divider DIV1 and nonlinear circuit 367 is made to output a large value.

The same bow pressure signal is first divided by a coefficient Cθ by the divider DIV1, and thereafter multiplied by the same coefficient C0 by the multiplier MUL3. The total characteristic line Cb indicated by the one-dot-chain line is an expansion of the characteristic C of the nonlinear circuit 367, with the abscissa and ordinate being multiplied by C0. A different characteristic may be generated by using different coefficients for the multiplier and divider.

Adders ADD6 and ADD7 are interposed on signal circulation paths La and Lb. The signal circulation path L is a closed loop corresponding to a string and circulating a musical tone. Two delay circuits 368 and 369, two low pass filters (LPF) 370 and 371, two attenuators 372 and 373, and two multipliers MUL4 and MUL5 are interposed on the signal circulation paths. The delay circuits 368 and 369 receive a pitch delay signal d and coefficients α and (1−α), and output predetermined delay times a * d and (1−a) * d.

The fundamental pitch of a musical tone is determined by the total delay time of a signal during one circulation in the signal circulation paths La and Lb. The sum d * [α+(1−α)] =d of the delay times of the two delay circuits 368 and 369 mainly determines the fundamental pitch. One delay circuit corresponds to the distance from a fret to the position where the bow and string contact together, and the other delay circuit corresponds to the distance between the depression position of a finger and the position where the bow and string contact each other.

The pitch is mainly determined by the delay circuits 368 and 369. There is another delay to be caused by other circuit elements on the signal circulation paths, such as LPFs 370 and 371, and attenuators 372 and 373. Strictly, the pitch of a generated musical tone is determined by a sum of all such delay times generated by the closed loop.

LPFs 370 and 371 simulate various vibration characteristics of a string by changing the transmission characteristic of a circulating waveform signal. A tone color signal determined by the depression position of the operating member 308 is supplied to LPFs 370 and 371 which change the transmission characteristic to simulate a desired musical tone of the stringed instrument.

While a vibration transmits over a string, it gradually attenuates. The attenuators 372 and 373 simulate the attenuation amount of a vibration transmitting over a string.

The multipliers MUL4 and MUL5 perform a multiplication of a reflectance −1, to simulate the reflection of a vibration at the string fixed position. Assuming a reflection at the fixed position without no attenuation, the amplitude of a string vibration inverts its phase. The reflectance −1 represents this phase-inverted reflection. The attenuation of the amplitude by the reflection is contained in the attenuation amounts of the attenuators 372 and 373.

Circulations of a vibration along the signal circulation paths La and Lb corresponding to a string simulate the motion of a string of the stringed instrument.

The motion of a string has a hysteresis characteristic. In order to simulate this, an output of the multiplier MUL3 is fed back to the input of the nonlinear circuit 367 via LPF 374 and MUL7. LPF 374 is used for preventing an oscillation of the feedback loop.

It is assumed that an input u is supplied from the adder ADD4 to the adder ADD5, that an input v is supplied from the feedback loop to the adder ADDS, and that the total amplification factor of the divider DIV1, nonlinear circuit 367, and multiplier MUL3 is A. Then, an output w of the multiplier MUL3 is given by (u+ v) * A. Assuming that the gain of the negative feedback circuit including LPF 374 and MUL7 is B, the feedback v is given by W * B. Accordingly, it stands that:

$$(u+wB)A=w, \text{ and therefore}$$

$$w=uA/(1-AB).$$

If there is no feedback, i.e., if B=0, then w= u * A meaning that the input u multiplied by the coefficient A is outputted. If a negative feedback at a gain B is performed, an input 1/((1−AB) time as that when B= 0 is required to obtain the same output.

Figure 25B:
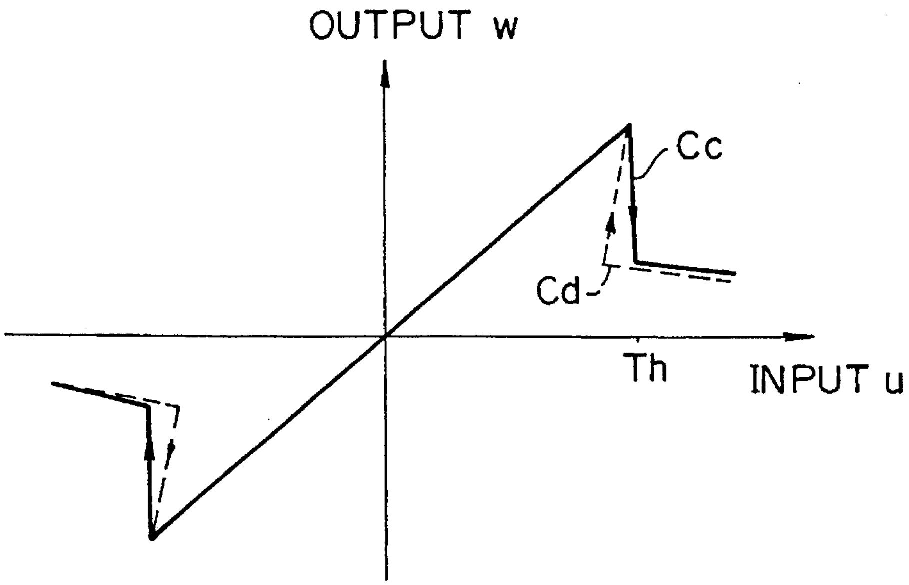

The characteristic Cc with a negative feedback is shown in FIG. 25B. As an input reaches a certain value, the dynamic friction coefficient becomes dominant over the static friction coefficient so that the output reduces stepwise. This threshold value is indicated by Th.

When the input is reduced after it once exceeded threshold value Th, the Feed back amount v= B * w is small because the output w is small. Even if the input to the nonlinear circuit 367 has the same level, an input u from the adder ADD4 to the adder ADD5 becomes smaller at the dynamic friction coefficient region than at the static friction coefficient region, because the negative feedback amount is small for the latter region.

Consider the switching between the static and dynamic friction coefficient regions. In the case where the input u from the adder ADD4 increases, the switching occurs at a higher input level, i.e., at the threshold value Th because the static friction coefficient is dominant and the strong negative feedback is provided. In the case where the input u decreases, the switching occurs at a lower input level because the dynamic friction coefficient is dominant and the weak negative feedback is provided. The hysteresis characteristic of the input u and output w in both the cases are indicated by Cc and Cd in FIG. 25B. The degree of hysteresis can be controlled by the gain of MUL7.

As shown in FIG. 24B, an output from one of the signal circulation paths La and Lb is supplied to a formant filter 375 simulating the characteristic of the body of the stringed instrument, and then to a sound system. The formant filter 375 may receive a tone color signal to change its characteristic.

A plurality of tone signal generators 323 shown in FIG. 24B are used similar to the case described with FIG. 13, to process a plurality of tones at a time in accordance with the program shown in FIG. 15 and stored in the tone control signal generator made of a microcomputer or the like. If the circuit shown in FIG. 24B is used for a violin, four channels are used to process four tones. It is apparent that, a single tone or five or more tones may be processed in an electronic musical instrument.

FIGS. 26A to 26D are schematic diagrams showing modifications of the embodiment shown in FIG. 20.

Figure 26A:
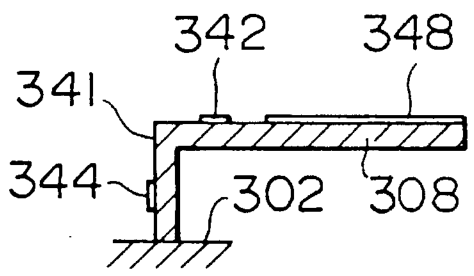
FIGS. 26A to 26D are schematic diagrams showing modifications of the embodiment of FIG. 20.

In FIG. 26A, an operating member 308 is of an L-character shape like that shown in FIG. 20. However, strain gauges 342 and 344 are attached to different positions. The strain gauge 342 is attached to the upper surface of the operating member 308, and the other strain gauge 344 is attached to an upright section 341 of the operating member 308.

Figure 26B:
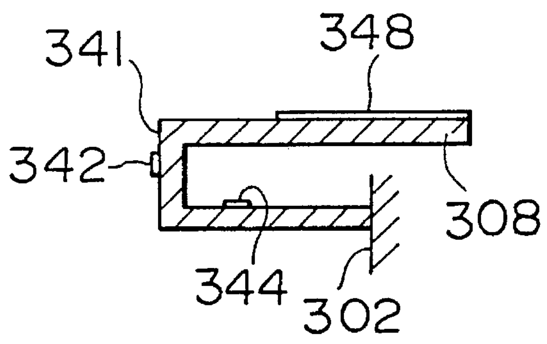

In FIG. 26B, an operating member is of a channel shape. One strain gauge 342 is attached to an upright section 341, and the other strain gauge 344 is attached to the upper surface of a lower leg portion of the operating member 308.

Figure 26C:
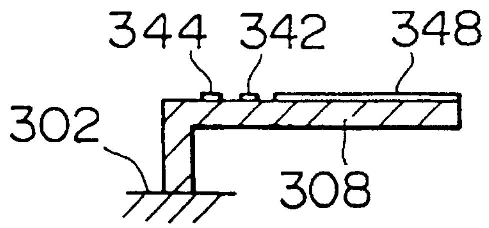

In FIG. 26C, an operating member 308 is of an L-character shape like that shown in FIG. 20. However, two strain gauges 342 and 344 are attached to the upper surface of the operating member 308.

Figure 26D:
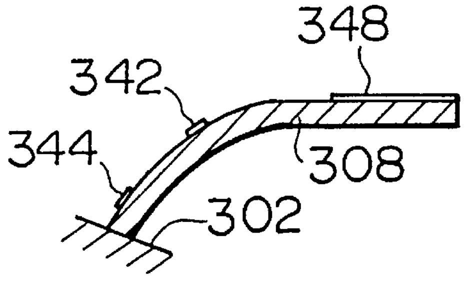

In FIG. 26D, an operating member 308 is of a gently curved shape, and two strain gauges 342 and 344 are attached to the upper surface of the member 308.

Figure 27A:
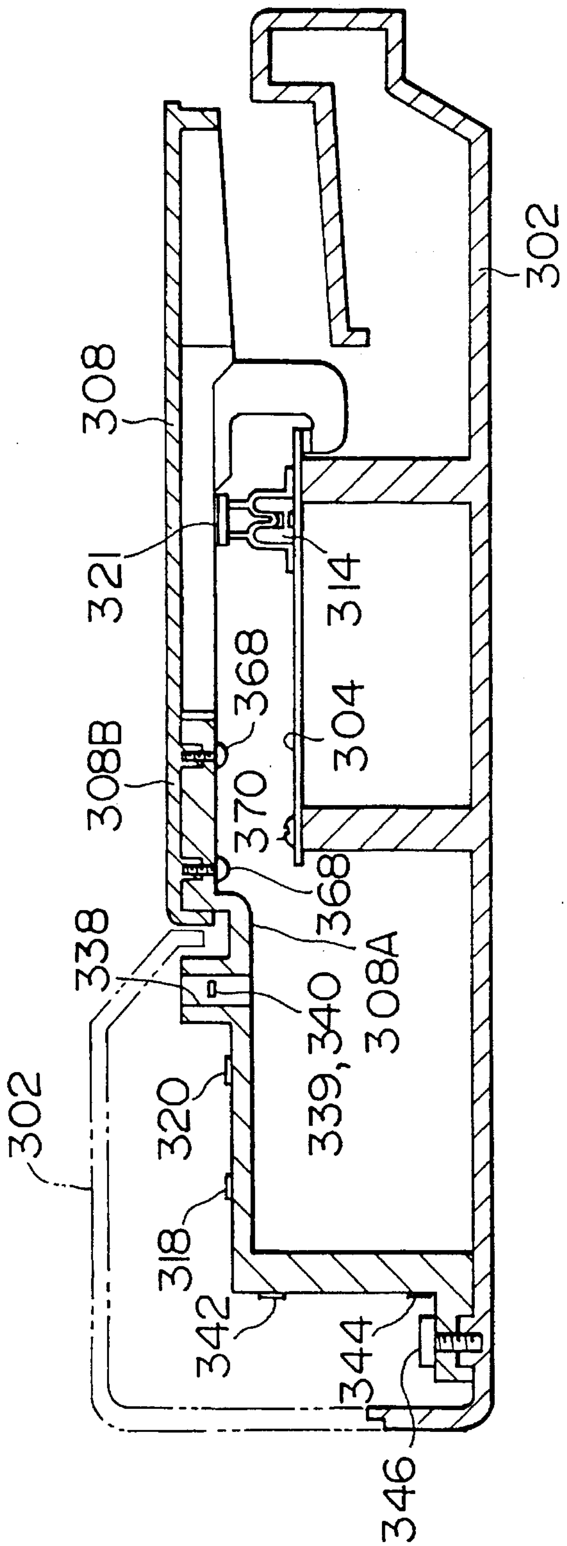
FIGS. 27A and 27B show the operating device for an electronic musical instrument according to another embodiment of the invention, FIG. 27A being a side view, and FIG. 27B being a partial plan view.
Figure 27B:
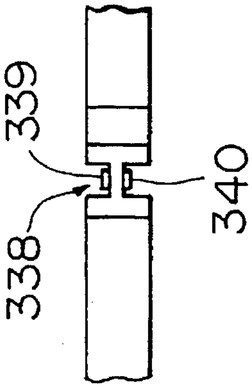

FIGS. 27A and 27B show the operating device for an electronic musical instrument according to another embodiment of the present invention. In this embodiment, an operating member 308 has a metal section 308A such as aluminum and a synthetic resin section 308B fixed to the section 8A by means of screws 368. One end of the operating member 308 is fixed to a frame 302 by a fastening member such as a bolt 346.

A support plate 304 is fixed to the frame 302 by a fastening member such as a screwy 370. A key switch 314 like that shown in FIG. 11 is mounted on the support plate 304.

Two strain gauges 318 and 320 are attached to the upper surface of the metal section 308A of the operating member 308, and other two strain gauges 342 and 344 are attached to an upright section of the metal section 8A. Recesses 338 like the embodiments shown in FIGS. 17 and 19 are formed in the operating member 308. As shown in FIG. 27B, other strain gauges 339 and 340 are attached to the bottom surfaces of the recesses 338.

In this embodiment, the strain gauges 318 and 320 and the pressure sensor 321 detect a vertical force F applied to the operating member in the vertical direction and its position. The strain gauges 339 and 340 detect a lateral force. The strain gauges 342 and 344 detect the direction θ of the force F. The direction θ of the force F may be detected by the strain gauges 318 and 344.

Figure 28:
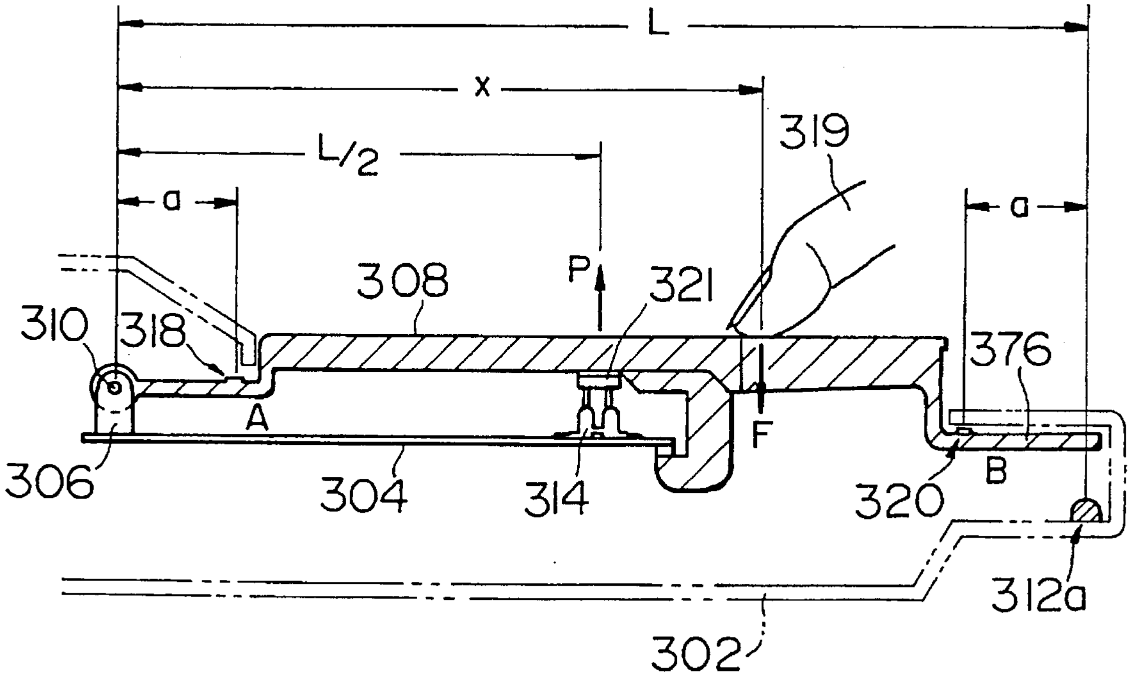
FIG. 28 is a side view showing the operating device for an electronic musical instrument according to a further embodiment of the invention.

FIG. 28 shows the operating device for an electronic musical instrument according to a further embodiment of the invention. In this embodiment, strain gauges 318 and 320 are attached to near the opposite end portions of an operating member 308. A stopper 312*a* is formed on a frame 302 on the right side of the strain gauge 320.

A horizontal extension 376 is integrally formed with the operating member 308 above the stopper 312*a*. A pressure sensor 321 is mounted on the operating member 308 at the position corresponding to a key switch 314.

Figure 29:
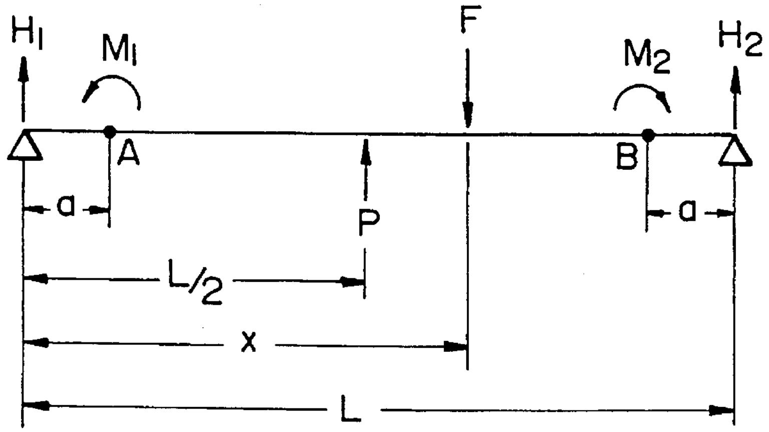
FIG. 29 is a schematic diagram explaining the dynamics of the embodiment shown in FIG. 28.

As a force F is applied to the operating member 308 with a finger 319 of a player, the operating member 308 rotates about a shaft 310 in the clockwise direction and abuts against the stopper 312*a*. The forces and moments applied to the operating member 308 after the abutment are schematically shown in FIG. 29.

The bending moments at the positions A and B where the strain gauges 318 and 320 are attached can be calculated from the equations (12) and (13) by using the outputs of the strain gauges 318 and 320, as in the following:

$$M1=z1*k1*\Delta R1$$

$$M2=z2*k2*\Delta R2,$$

wherein z1 and z2 represent the section moduli at the positions A and B.

If the strain gauges 318 and 320 of the same characteristic are used, then k1= k2, and if the sections have the same shape, then z1= z2.

Substituting z1 * k1= z2 * k2= c into the above equations results in:

$$M1= c * \Delta R1 \quad (24)$$

$$M2= c * \Delta R2 \quad (25).$$

The force F and position x are obtained from the moment balance conditions as in the following, assuming that the distance from the shaft 310 of the operating member 308 and the stopper 312*a* is L, the distance from the shaft 310 to the key switch 314 is L/2, and the distance from the strain gauge 318 to the shaft 310 and the distance from the strain gauge 320 to the stopper 312*a* are a:

$$H1=[(L-x)/L]F-P/2$$

$$H2=xF/L-P/2,$$

where P is a reaction force applied by the key switch 314 and detected by the pressure sensor 321.

Accordingly, it stands that:

$$M1=[(L-x)/F-P/2] * a \quad (26)$$

$$M2= (LF/x-P/2) * a \quad (27).$$

By substituting the equation (27) into the equation (25) and the equation (28) into the equation (26), the force F and position x can be calculated from the two equations (25) and (26) as:

$$F=[(c\Delta R1+c\Delta R2)/a]+P$$

$$x=[c\Delta R2+(Pa/2)]/(c\Delta R1+c\Delta R2+aP).$$

Therefore, by calculating the force P and resistance changes ΔR1 and ΔR2, the force F and its position x can be known.

Figure 30:
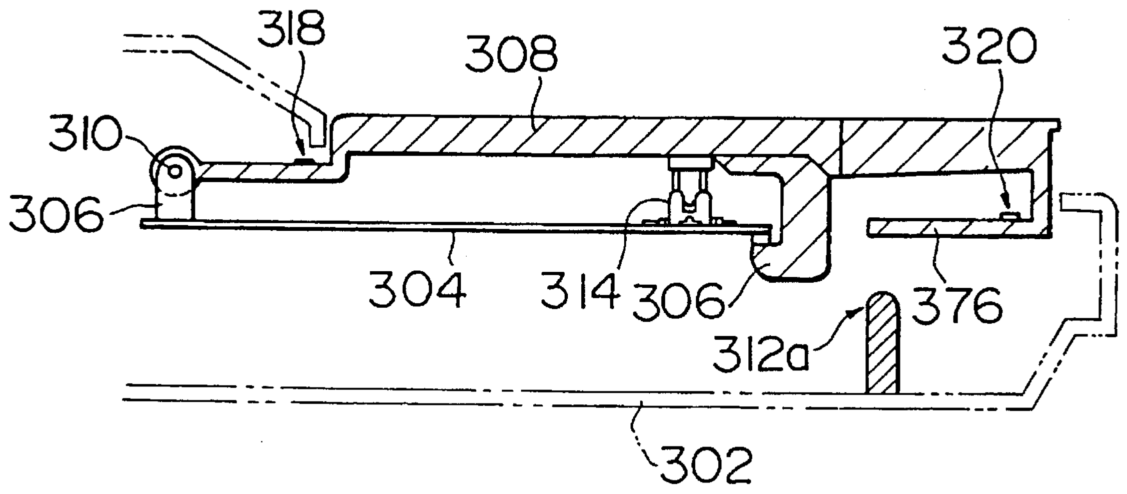
FIG. 30 shows the operating device for an electronic musical instrument according to a still further embodiment of the invention.

FIG. 30 shows the operating device for an electronic musical instrument according to a still further embodiment of the invention. In this embodiment, like the embodiment shown in FIG. 20, strain gauges 318 and 320 are attached to an operating member 308 near the opposite end portions, a stopper 312*a* is mounted on a frame 302, and a horizontal extension 376 is integrally formed with the operating member 308 above the stopper 312*a*. The embodiment differs from that shown in FIG. 28 in that the stopper 312*a* is mounted on the frame not on the right side but on the left side of the right strain gauge 320.

Figure 31:
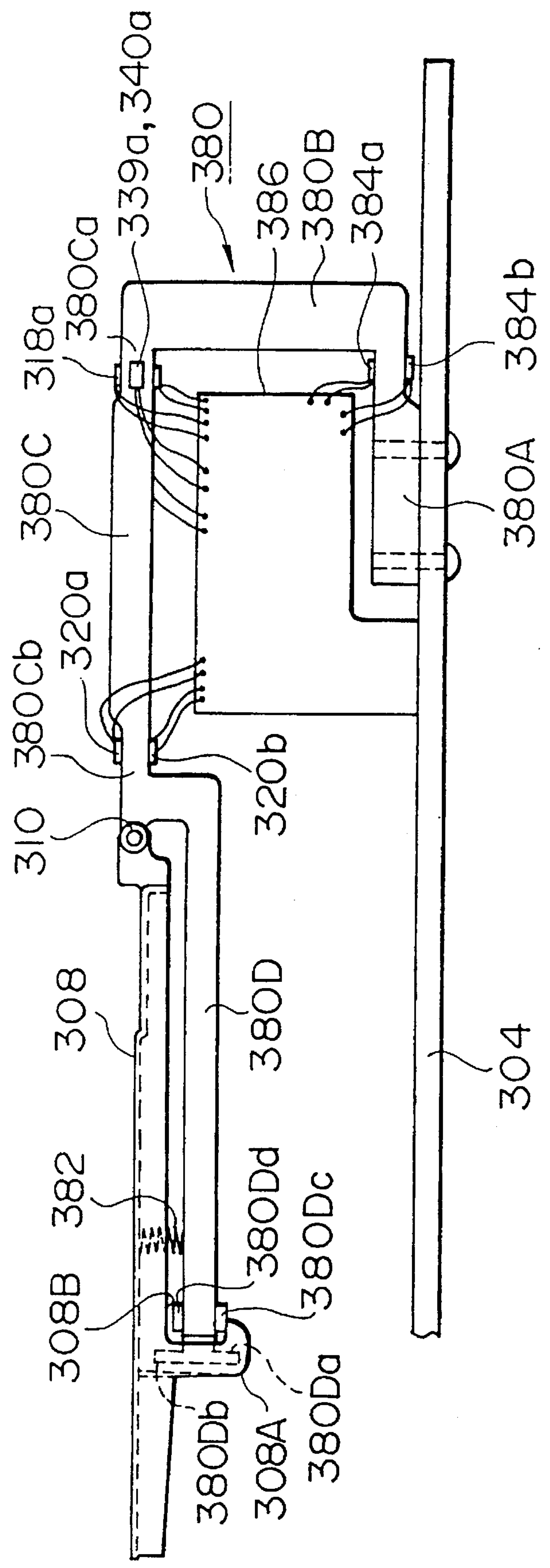
FIG. 31 is a side view showing the operating device for an electronic musical instrument according to another embodiment of the invention.

FIG. 31 shows the operating device according to another embodiment of the invention. The operating device 380 has a channel shaped resilient body whose upper leg 80C is extended as a lip portion 380D. The lower leg 380A of the channel shaped body is fixed to a support plate 304 by screws. An operating member 308 is mounted rotatable about a shaft 310 at the proximal end of the lip portion 380D (at the front end of the upper leg 380C). An operating member guide portion 308A is guided by protruded guide pieces 380D*a* and 380D*b* formed at the distal end of the lip portion 380D. Upper and lower limit stoppers 380D*c* and 380D*d* are mounted on the lip portion 380D slightly inside of the distal end. As the operating member 308 is depressed, the bottom surface 308B of the operating member 308 facing the lower limit stopper 380D*d* abuts against the stopper 380D*d*. This motion quantity (play) is 1 to 3 mm For example. The motion quantity (total stroke) of a usual piano key is about 10 min. The strength of a coil spring 382 is set so as to satisfy the following conditions.

(1) The strength of the coil spring 382 is set to be so weak that the operating device 80 deforms scarcely until the bottom surface 308B abuts against the stopper 380D*d* and that no output is delivered from strain gauges 320*a*, 320*b*, 318*a*, 318*b*, 384*a* and 384*b*.

(2) The strength of the coil spring 382 is set properly so that a small output is delivered from the sensors immediately before the abutment. The small output corresponds to a sound volume of about PP or PPP.

Basically, sensors are paired at the upper and lower positions or at the right and left positions to differentially obtain an output having a doubled level for the displacement in one direction, although one sensor per one position is sufficient, in principle.

The sensors 320*a* and 320*b*, and 318*a* and 318*b* provide the same function of the sensors 318 and 320 shown in FIGS. 11A and 11B, 13, 16, and 19 and of the sensors 342 and 344 shown in FIG. 26C. The sensors 339*a* and 340*a* are used for the same purpose as the sensors 339 and 340 shown in FIGS. 27A and 27B (two right and left sensors are used to obtain a doubled output signal level described above).

A combination of the sensors 384*a* and 384*b* and sensors 318*a* and 318*b* detects the displacement of the operating member in the longitudinal direction (in the right/left direction as viewed in FIG. 31).

A controller 386 is mounted within a space of the channel-shaped body. This controller may be an interface circuit between the sensor bridge circuit of each operating member and the main circuit such as the musical tone control signal generator 322, or a circuit including both the sensor bridge circuit and generator 322.

The present invention has been described in connection with the above embodiments shown in the drawings. The invention is not intended to be limited only to the embodiments, but it is apparent for those skilled in the art that various substitutions, combinations, additions, deletions, and the like are possible.

I claim:

1. An operating device for an electronic musical instrument comprising:

an operating member of a predetermined length supported at one end of said operating member;

at least two sensors mounted on said operating member at two different positions in the longitudinal direction, said two sensors each generating a signal proportional to the distortion amount of said operating member; and musical tone controlling means for obtaining a difference between two signals outputted from said two sensors and generating a control signal so as to control a musical tone to be generated, in accordance with said difference.

2. An operating device according to claim 1, wherein said operating member is supported rotatably by said one end and includes a force imparting member coupling to said operating member at an intermediate position between said one end and said sensors.

3. An operating device according to claim 2, wherein said force imparting member includes one end coupling to said operating member at said intermediate position, the other end having a mass body, and an intermediate section coupling said one end and said other end of said force imparting member.

4. An operating device according to claim 1, wherein said operating member is formed of metal.

5. An operating device for an electronic musical instrument comprising:

an operating member supporting member;

an operating member of a cantilever structure having a fixed end and a free end, said fixed end being fixed to said operating member supporting member; and at least two sensors mounted at different positions on said operating member for collectively generating an electrical output corresponding to a magnitude of a depression force applied to said operating member.

6. An operating device according to claim 5, wherein said operating member is of an L-character shape having a long side and a short side, one end of said operating member at said short side is said fixed end, and the other end of said operating member at said long side is said free end.

7. An operating device according to claim 6, wherein said long side of said operating member includes a resilient metal section formed integrally with said short side and a resin section coupled to said resilient metal section.

8. An operating device according to claim 6, wherein said short side of said operating member is formed with a hollow portion.

9. An operating device according to claim 8, wherein said sensor means includes a first sensor mounted on the wall of said hollow portion and a second sensor mounted on said long side.

10. An electronic musical tone controller comprising:

operating member long in the direction of the axis of said operating member;

at least two sensors mounted on said operating member at at least two different positions in the axial direction for detecting the distortion amount of said operating member;

musical tone control signal generating means for obtaining a force applied to said operating member and a force-applied position of said operating member in accordance with a signal outputted from each said sensor, and generating a control signal corresponding to said obtained force and position; and musical tone signal generating means for generating a musical tone signal in accordance with said control signal supplied from said musical tone control signal generating means.

11. An electronic musical tone controller according to claim 10, wherein said operating member includes a rotary section rotatably supported at one end.

12. An electronic musical tone controller according to claim 11, further comprising a resilient member facing said rotary section for generating a reaction force in response to the rotation of said rotary section.

13. An electronic musical tone controller according to claim 12, wherein said resilient member is adapted substantially not to generate said reaction force at the initial stage of said rotation.

14. An electronic musical tone controller according to claim 12, further comprising a pressure sensor coupled to said resilient member for detecting said reaction force.

15. An electronic musical tone controller according to claim 12, further comprising a stopper member for limiting said rotation of said rotary section.

16. An electronic musical tone controller according to claim 10, wherein said operating member includes a flexure portion having an elasticity weaker than the elasticity of the other portion of said operating member.

17. An electronic musical tone controller according to claim 10, wherein at least one of said sensors is mounted on said flexure portion.

18. An electronic musical tone controller according to claim 10, wherein said musical tone signal generating means including a loop circuit having a serial circuit of a delay circuit and a filter.

19. An electronic musical tone controller comprising:

an operating member;

at least two sensors mounted on said operating member at least at two different positions for detecting the distortion amount of said operating member;

musical tone control signal generating means for obtaining a force applied to said operating member in accordance with a signal output from each said sensor, and generating a control signal corresponding to said obtained force;

a resilient member for generating a reaction force in response to the depression of said operating member; and a pressure sensor for detecting said reaction force.

20. An electronic musical tone controller according to claim 19, wherein said operating member includes a flexure portion having an elasticity weaker than the elasticity of the other portion of said operating member.

21. An electronic musical tone controller according to claim 20, wherein at least one of said sensors is mounted on said flexure portion.

22. An electronic musical tone controller according to claim 19, further comprising musical tone signal generating means for generating a musical tone signal in accordance with a control signal supplied from musical tone control signal generating means, said musical tone signal generating means including a loop circuit having a serial circuit of a delay circuit and a filter.

23. An electronic musical tone controller according to claim 19, wherein said resilient member is adapted substantially not to generate said reaction force at the initial stage of said depression.

24. An electronic musical tone controller according to claim 19, wherein said pressure sensor is coupled to said resilient member.

25. An electronic musical tone controller according to claim 19, further comprising a stopper member for limiting said depression of said operating member.

26. An electronic musical tone controller comprising:

an operating member;

at least two sensors mounted on said operating member at least at two different positions for detecting a distortion amount of said operating member;

musical tone control signal generating means for obtaining a force applied to said operating member in accordance with a signal output from each said sensor, and generating a control signal corresponding to said obtained force; and a position sensor mounted on said operating member for detecting the position where a depression force is applied.

27. An electronic musical tone controller comprising:

an operating member extending in a longitudinal direction;

plurality of sensors for detecting the distortion amount of said operating member, said sensors mounted on said operating member at least two different positions in the longitudinal direction and at least one or more positions in a direction different from said longitudinal direction;

musical tone control signal generating means for obtaining a force applied to said operating member and a force applied position in accordance with signals from said sensors mounted at least two different positions in said longitudinal direction, obtaining direction of said force applied to said operating member in accordance with signals from said one or more sensors mounted at least one or more positions in the direction different from said longitudinal direction and said signals from said sensors mounted at least two different positions, and generating control signals corresponding to said force, said force-applied position, and said direction of force; and musical tone signal generating means for generating a musical tone in accordance with said control signals supplied from said musical tone control signal generating means.

28. An electronic musical tone controller according to claim 27, wherein said musical tone signal generating means includes a loop circuit having a delay circuit and a filter.

29. An electronic musical tone controller according to claim 27, further comprising a resilient member for generating a reaction force in response to the depression of said operating member.

30. An electronic musical tone controller according to claim 29, wherein said resilient member is adapted substantially not to generate said reaction force at the initial stage of said depression.

31. An electronic musical tone controller according to claim 27, wherein said operating member includes a flexure portion having an elasticity weaker than said elasticity of said operating member.

32. An electronic musical tone controller according to claim 31, wherein at least one of said sensors is mounted on said flexure portion.

33. An operating device for an electronic musical instrument comprising:

an operating member support;

an operating member having a cantilevered structure with a fixed end and a free end, said fixed end being fixed to said operating member support; and at least two sensors mounted at different positions on said operating member for collectively generating an electrical output corresponding to a magnitude of a depression force applied to said operating member, wherein said operating member has a rod shape with an elongated surface along a longitudinal direction and said at least two sensors are spaced apart along said elongated surface of said operating member.

34. An operating device according to claim 33, wherein said operating member is of an L-character shape having a long side and a short side, one end of said operating member at said short side is said fixed end, and the other end of said operating member at said long side is said free end.

35. An operating device according to claim 34, wherein said long side of said operating member includes a resilient metal section formed integrally with said short side and a resin section coupled to said resilient metal section.

36. An electronic musical tone controller according to claim 10, further comprising:

a second sensor mounted on said operating member at a position in a direction different from said axial direction for detecting the distortion amount of said operating member, wherein said musical tone control signal generating means obtains direction of said force applied to said operating member in accordance with signals from said at least two sensors and from said second sensor and generates control signals corresponding to said force, said force-applied position, and said direction of force.

* * * * *